(12) United States Patent
Torresani et al.

(10) Patent No.: US 10,134,218 B2
(45) Date of Patent: Nov. 20, 2018

(54) NETWORK CONNECTED DISPENSING DEVICE

(71) Applicant: Accenture Global Solutions Limited, Dublin (IE)

(72) Inventors: Giorgio Torresani, Atlanta, GA (US); Jeffrey Scott Sawyer, Atlanta, GA (US); Puneet Sawhney, Marietta, GA (US); Austin S. Groves, Atlanta, GA (US); Drashti Sunit Patel, Norcross, GA (US)

(73) Assignee: Accenture Global Solutions Limited, Dublin (IE)

( * ) Notice: Subject to any disclaimer, the term of this patent is extended or adjusted under 35 U.S.C. 154(b) by 123 days.

(21) Appl. No.: 15/169,518

(22) Filed: May 31, 2016

(65) Prior Publication Data

US 2017/0345245 A1    Nov. 30, 2017

(51) Int. Cl.
| | | |
|---|---|---|
| G07F 11/00 | (2006.01) | |
| H04W 4/00 | (2018.01) | |
| G05B 15/02 | (2006.01) | |
| H04W 4/80 | (2018.01) | |
| G07F 9/02 | (2006.01) | |
| G07F 9/10 | (2006.01) | |

(52) U.S. Cl.
CPC ............ *G07F 11/002* (2013.01); *G05B 15/02* (2013.01); *G07F 9/026* (2013.01); *G07F 9/105* (2013.01); *H04W 4/008* (2013.01); *H04W 4/80* (2018.02)

(58) Field of Classification Search
CPC ........ G07F 11/002; G07F 9/026; G07F 9/105; H04W 4/008

USPC .......................................... 700/236, 241, 244
See application file for complete search history.

(56) References Cited

U.S. PATENT DOCUMENTS

| | | | |
|---|---|---|---|
| 5,608,643 A | | 3/1997 | Wichter et al. |
| 5,728,999 A | * | 3/1998 | Teicher .................. G06Q 20/04 |
| | | | 235/380 |

(Continued)

FOREIGN PATENT DOCUMENTS

| | | |
|---|---|---|
| CN | 201689486 U | 12/2010 |
| CN | 202268020 U | 6/2012 |

(Continued)

OTHER PUBLICATIONS

Extended European Search Report corresponding to EP 17 15 3486.0, dated May 24, 2017, 13 pages.

(Continued)

*Primary Examiner* — Michael Collins
(74) *Attorney, Agent, or Firm* — Harrity & Harrity, LLP

(57) ABSTRACT

A device may obtain sensor data regarding the vending device. The device may transmit the sensor data via a network connection for processing by a server. The server may store a data model. The server may be associated with identifying a response action associated with altering a configuration of the vending device. The device may receive information identifying the response action based on transmitting the sensor data via the network connection. The device may cause the response action to be performed based on receiving the information identifying the response action. The response action may be associated with altering a status of a component of the vending device. The device may provide information associated with identifying the status of the component.

20 Claims, 16 Drawing Sheets

(56) References Cited

U.S. PATENT DOCUMENTS

| | | | |
|---|---|---|---|
| 6,339,731 | B1 | 1/2002 | Morris et al. |
| 6,430,268 | B1 | 8/2002 | Petite |
| 6,628,764 | B1 | 9/2003 | Petite |
| 6,764,003 | B1 | 7/2004 | Martschitsch et al. |
| 7,783,389 | B2 | 8/2010 | Yamada |
| 7,997,484 | B2 | 8/2011 | Godwin et al. |
| 8,140,185 | B2 | 3/2012 | Simmons |
| 9,218,703 | B2 * | 12/2015 | Insolia .................. G07F 11/002 |
| 2003/0074106 | A1 | 4/2003 | Butler |
| 2003/0178435 | A1 | 9/2003 | Yamaguchi |
| 2004/0133653 | A1 | 7/2004 | Defosse et al. |
| 2005/0285716 | A1 | 12/2005 | Denison et al. |
| 2006/0190345 | A1 | 8/2006 | Crowley |
| 2006/0219517 | A1 | 10/2006 | Cheng et al. |
| 2006/0220845 | A1 | 10/2006 | Agrawal et al. |
| 2006/0282323 | A1 | 12/2006 | Walker et al. |
| 2006/0287098 | A1 | 12/2006 | Morrow et al. |
| 2008/0040211 | A1 | 2/2008 | Walker et al. |
| 2008/0046118 | A1 | 2/2008 | Tedesco et al. |
| 2008/0077275 | A1 | 3/2008 | Merwarth et al. |
| 2009/0125603 | A1 | 5/2009 | Atashband et al. |
| 2009/0306819 | A1 * | 12/2009 | Insolia ...................... G07F 9/02 700/232 |
| 2010/0138037 | A1 | 6/2010 | Adelberg et al. |
| 2011/0016514 | A1 | 1/2011 | De Carlo et al. |
| 2013/0144428 | A1 | 6/2013 | Irwin et al. |
| 2013/0261795 | A1 | 10/2013 | Long et al. |
| 2014/0142748 | A1 | 5/2014 | Geigel et al. |
| 2014/0316875 | A1 * | 10/2014 | Tkachenko ........... G07F 11/002 705/14.25 |
| 2014/0336791 | A1 | 11/2014 | Asenjo et al. |
| 2015/0034667 | A1 | 2/2015 | Shimmerlik et al. |

FOREIGN PATENT DOCUMENTS

| | | |
|---|---|---|
| CN | 104778784 | 7/2015 |
| JP | 2001093031 | 4/2001 |
| JP | 2001331855 | 11/2001 |
| JP | 2001344641 | 12/2001 |
| JP | 2005165552 | 6/2005 |
| WO | 95/05609 | 2/1995 |
| WO | WO 96/07145 A1 | 3/1996 |
| WO | 98/45779 | 10/1998 |
| WO | WO 02/19281 A2 | 3/2002 |
| WO | 2006/039366 A2 | 4/2006 |
| WO | WO 2008/054037 A1 | 5/2008 |
| WO | WO 2015/023765 | 2/2015 |
| WO | WO 2016/004235 A2 | 1/2016 |

OTHER PUBLICATIONS

McKinsey&Company, "The Internet of Things: Mapping the Value Beyond the Hype," http://apo.org.au/resource/internet-things-mapping-value-beyond-hype, Jun. 2015, 24 pages.

Lee et al., "The Internet of Things (IoT): Applications, investments, and challenges for enterprises", Business Horizons, vol. 58, Issue 4, Aug. 2015, 10 pages.

Extended European Search Report corresponding to EP 17 15 3498, dated Jul. 27, 2017, 8 pages.

Extended European Search Report corresponding to EP 17 15 3462.1, dated May 10, 2017, 9 pages.

Ciufo, C. A., "Embedded Tech for Un bottling All That Vending Machine Data", [retrieved from internet 1'\ on Oct. 2, 2017] <URL:https://web.archive.org/web/20150315011758/http:i/eecatalog.com/lo T/2015/03/12/embedded-tech-for-unbottling-all-that-vending-machine-data/> published on Mar. 12, 2015 as per Wayback Machine, 6 pages.

* cited by examiner

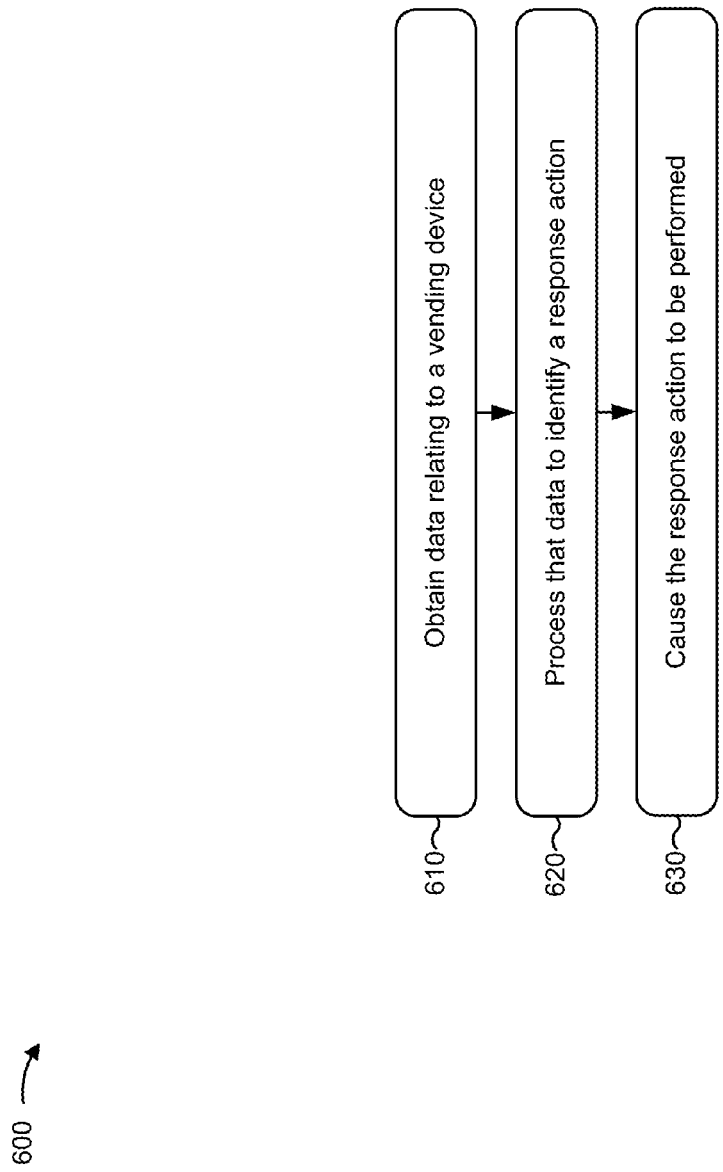

NETWORK CONNECTED DISPENSING DEVICE

BACKGROUND

A vending device (i.e., a dispensing device), such as a cold drink equipment (CDE) vending device, a candy vending device, a stamp vending device, or the like may be utilized to provide a point-of-sale at a location. For example, the vending device may be located inside a store, at a stadium, near a train station, in an office building, in an apartment building, or the like. The vending device may store one or more products that are offered for sale to customers. For example, the vending device may be stocked with one or more types of soft drink, one or more types of candy, one or more types of stamps, or the like. A technician may be deployed to determine a quantity of items of product that are stored in the vending device, and refill the vending device to ensure that a quantity of items of a particular type of product satisfies a threshold. The technician may collect money deposited in the vending device, and return the money to a vending device provider.

SUMMARY

According to some possible implementations, a network connected dispensing device may include a storage unit to house one or more items to be dispensed. The network connected dispensing device may include a set of sensor modules to obtain sensor data regarding the network connected dispensing device. The set of sensor modules may include two or more of a temperature sensor, an image sensor, a motion sensor, or a location sensor. The network connected dispensing device may include a management module. The management module may be associated with receiving the sensor data from the set of sensor modules to be processed to identify a response action. The management module may be associated with providing information associated with the sensor data to a cloud server of a cloud network via a network connection and receiving information from the cloud server regarding the response action. The network connected dispensing device may include an integration module. The integration module may be associated with causing an alteration to a component of the network connected dispensing device based on the response action being identified. The alteration to the component may be related to causing the one or more items to be made available to be dispensed.

According to some possible implementations, a cold drink equipment may include a refrigerated storage unit to house one or more items of product for sale. The refrigerated storage unit may include a door that permits a distribution of a particular item of product of the one or more items of product for sale. The cold drink equipment may include a set of sensors to obtain sensor data regarding the cold drink equipment. The set of sensors may include a door sensor to detect that the door is opened, an image sensor to detect contents of the refrigerated storage unit, and a temperature sensor to obtain an internal temperature of the refrigerated storage unit. The cold drink equipment may include a communications module to provide the sensor data to be processed using a data model and to receive information identifying a response action based on providing the sensor data to be processed using the data model. The response action may relate to an alteration to a configuration of the cold drink equipment. The cold drink equipment may include an integration module to cause the alteration to the configuration of the cold drink equipment based on the response action.

According to some possible implementations, a method may include obtaining, by a vending device, sensor data regarding the vending device. The sensor data may be obtained from a group of sensors of the vending device. The method may include transmitting, by the vending device, the sensor data via a network connection for processing by a server. The server may store a data model. The server may be associated with identifying a response action associated with altering a configuration of the vending device. The method may include receiving, by the vending device, information identifying the response action based on transmitting the sensor data via the network connection. The method may include causing, by the vending device, the response action to be performed based on receiving the information identifying the response action. The response action may be associated with altering a status of a component of the vending device. The method may include providing, by the vending device, information associated with identifying the status of the component.

BRIEF DESCRIPTION OF THE DRAWINGS

FIG. 6 is a flow chart of an example process for managing a group of vending devices;

DETAILED DESCRIPTION

The following detailed description of example implementations refers to the accompanying drawings. The same reference numbers in different drawings may identify the same or similar elements.

A vending device provider may distribute a group of vending devices to provide a point-of-sale for a set of product items. For example, the vending device provider may deploy a technician to set up a cold drink equipment (CDE) vending device to sell one or more types of juice product items, one or more types of soft drink product items, or the like. Similarly, the vending device provider may set up one or more vending devices to sell one or more types of food product items, one or more types of electronic devices, one or more types of stamps, or the like. When a user of a vending device (e.g., a customer) notices that the vending device is malfunctioning, the user may call a phone number identified on the vending device to notify the vending device provider, and the vending device provider may deploy an inspector to inspect the vending device, a technician to repair the vending device, or the like. Periodically, the product vendor may deploy a technician to refill the vending device with items of a product. For example, the technician may follow a daily route to refill a group of vending devices.

However, a delay in deployment of a technician may result in lost sales as a result of a malfunctioning vending device, a vending device failing to be refilled with a particular type of item of product, or the like. Moreover, relatively frequent opening of a cooler portion of a vending device, irregular hours of usage of the vending device, or the like may cause an excessive power consumption, a reduction in a lifespan of a component of the vending device (e.g., a compressor), or the like. Implementations, described herein, may utilize a set of sensors incorporated into a vending device, such as a location sensor, an image sensor, a temperature sensor, a power consumption sensor, or the like and/or analytics regarding data obtained from the set of sensors and/or one or more other data sources to improve operation of the vending device relative to the vending device lacking the set of sensors. Moreover, the vending device may utilize a network connection to provide data to a server device (e.g., a cloud server) for processing to improve management of the vending device. In this way, the vending device may be controlled to operate more efficiently relative to another vending device that does not include one or more sensors.

Figure 1:
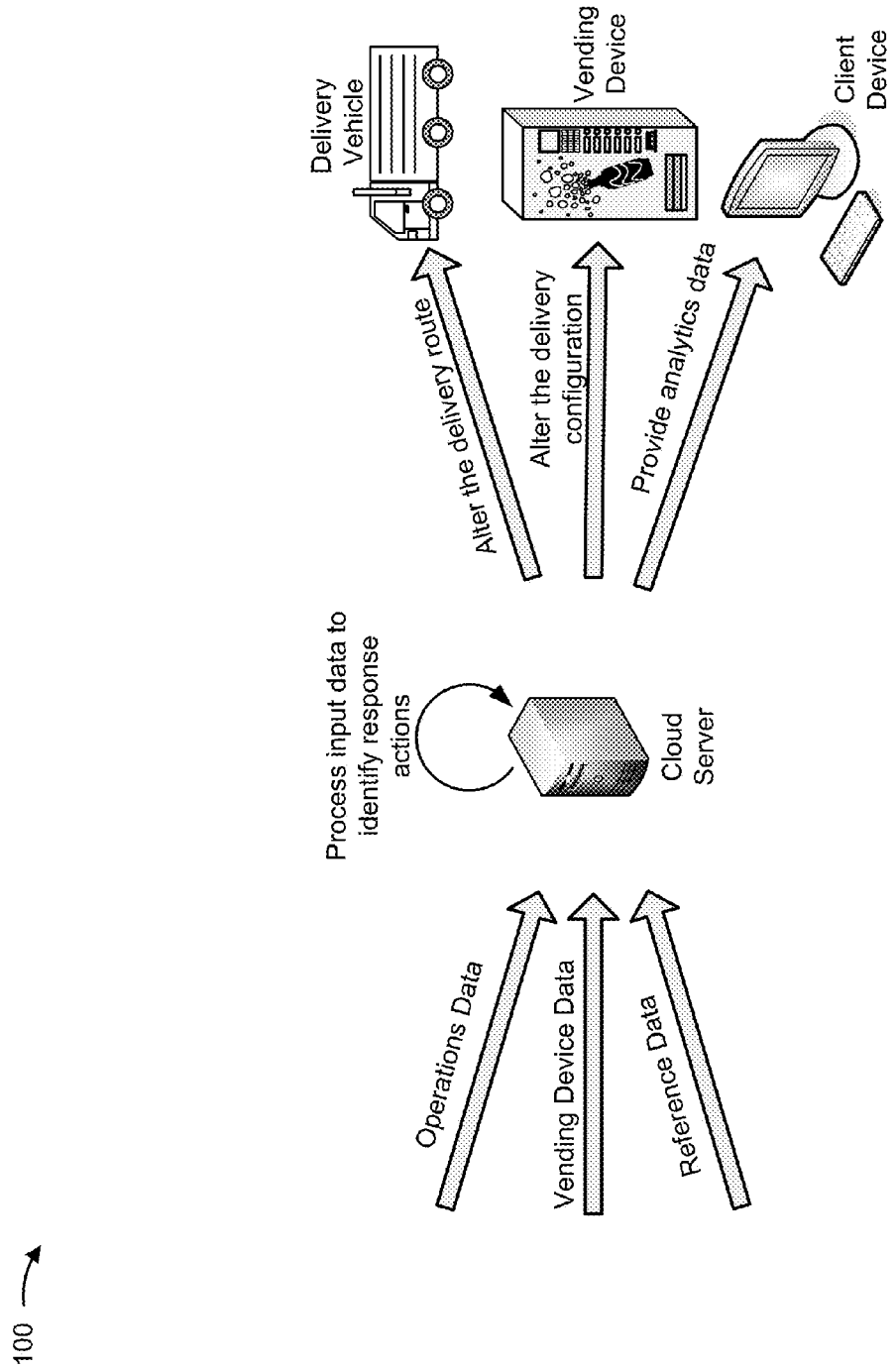
FIG. 1 is a diagram of an overview of an example implementation described herein.

FIG. 1 is a diagram of an overview of an example implementation 100 described herein. As shown in FIG. 1, example implementation 100 may include a cloud server, a user device (e.g., which is located inside a delivery vehicle), a vending device, and a client device.

As further shown in FIG. 1, the cloud server may receive input data. For example, the cloud server may receive operations data, such as data identifying a location of a delivery vehicle, contents of the delivery vehicle (e.g., a quantity of a particular type of item of product in the delivery vehicle), a location of one or more technicians, or the like. Additionally, or alternatively, the cloud server may receive vending device data, such as data obtained by the vending device utilizing an integrated set of sensors. The vending device data may include data identifying a temperature of the vending device, a utilization of the vending device (e.g., a quantity of sales via the vending device or a quantity of door opens of a cooler door of the vending device), a location of the vending device, or the like. Additionally, or alternatively, the cloud server may receive reference data, such as data identifying hours of operation for a store that includes the vending device, data identifying a schedule of events at a location within a particular proximity of the vending device (e.g., a stadium), data identifying a weather condition for a location of the vending device, or the like.

As further shown in FIG. 1, the cloud server may process the input data to identify a response action, such as an operations response action, a vending device response action, or the like. For example, the cloud server may process the input data to determine an operations response action, such as altering a delivery route of the delivery vehicle to cause the vending device to be refilled with a product. Similarly, the cloud server may identify an operations response action associated with causing one or more technicians to be deployed to alter a configuration of a vending device. Similarly, the cloud server may identify an operations response action associated with causing an inspector to be deployed to inspect the vending device and cause the vending device to be moved to another location.

Similarly, the cloud server may identify an operations response action associated with causing a message to be transmitted, such as a message indicating that one or more items of product (e.g., a competitor product) are to be removed from the vending device. For example, when the cloud server determines that the vending device stores a first set of items of product associated with a first entity (e.g., a vending device provider) and a second set of items of product associated with a second entity (e.g., a competitor), the cloud server may determine that the second set of items of product are to be removed. The cloud server may cause the operations response action to be implemented. For example, the cloud server may transmit an alert to the user device to cause a user interface to be provided identifying an altered delivery route, a repair that is to be performed, a set of items of product that are to be removed from the vending device, or the like. In this way, the cloud server improves operations for the vending device, thereby reducing costs (e.g., associated with product distribution or vending device maintenance), reducing a likelihood of a vending device malfunction, increasing a rapidity of vending device restocking, or the like relative to managing operations for a vending device without receiving data from the vending device.

Additionally, or alternatively, the cloud server may process the input data to identify an alteration to a power management configuration to reduce a power utilization of the vending device. Similarly, the cloud server may alter a configuration of a component of the vending device (e.g., a compressor) to reduce a likelihood of a component failure. Similarly, the cloud server may process the input data to generate offer data identifying an offer for sale, such as a discount to a type of item of product, a promotion of a type of item of product, or the like. Similarly, the cloud server may process the input data to identify an alteration to a data collection management configuration of the vending device, such as an alteration to a frequency of data collection, a type of data that is collected, or the like. In this case, the cloud server may transmit information to the vending device to cause the vending device to implement a vending device response action. In this way, the cloud server reduces a power consumption of the vending device, increases sales for the vending device, reduces a likelihood of component failure for the vending device, or the like relative to a statically configured vending device.

Additionally, or alternatively, the cloud server may process the input data to generate analytics information. For example, the cloud server may generate a user interface identifying a real-times sales metric, a past sales metric, a predicted sales metric, a predicted vending device failure rate, or the like. Similarly, the cloud server may generate a set of recommendations relating to an operations response action, a vending device response action, or the like, and may provide a user interface identifying the set of recommendations for display via the client device. In this case, based on detecting a user interaction with the user interface of the client device, the cloud server may cause an operations response action, a vending device response action, or the like to be performed. In this way, the cloud server provides information regarding a particular vending device, operations for supporting a group of vending devices, or the like with increased granularity relative to information generated based on refill data manually recorded by a technician.

As indicated above, FIG. 1 is provided merely as an example. Other examples are possible and may differ from what was described with regard to FIG. 1.

Figure 2:
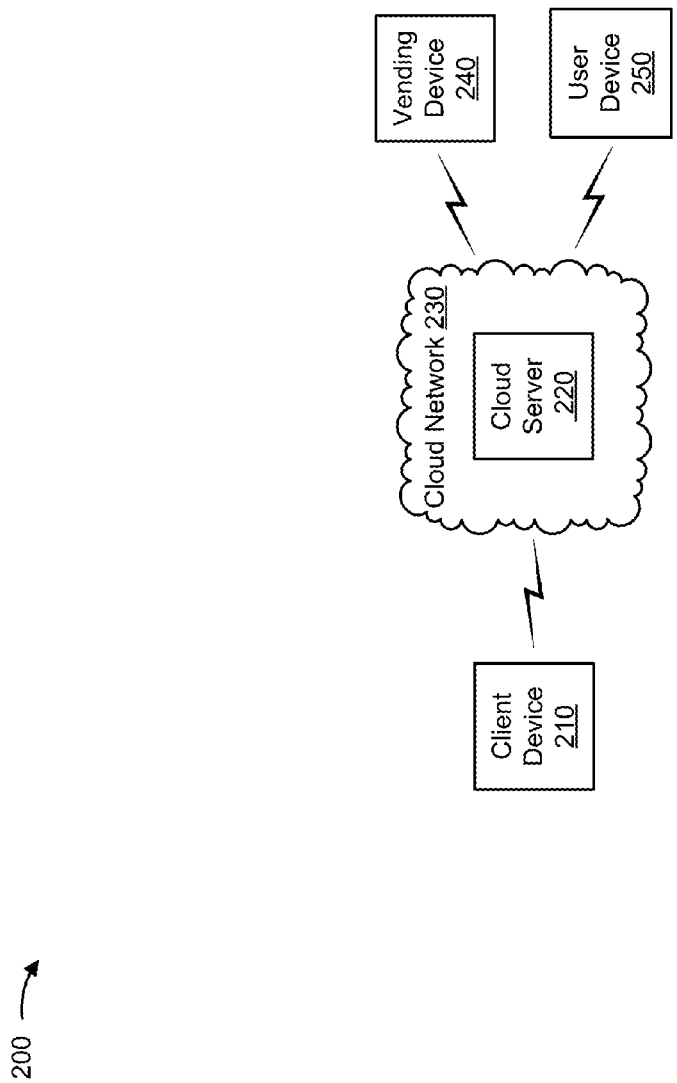
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud server 220, a cloud network 230, a vending device 240, and a user device 250. Devices of environment 200 may interconnect via wired connections, wireless connections, or a combination of wired and wireless connections. For example, devices of environment 200 may connect via a cellular network (e.g., a long term evolution (LTE) network, a 3G network, or a code division multiple access (CDMA) network), a public land mobile network (PLMN), a local area network (LAN) (e.g., a Bluetooth-based network, a Wi-Fi-based network, a Zigbee-based network, or a mesh network), a wide area network (WAN), a metropolitan area network (MAN), a telephone network (e.g., the Public Switched Telephone Network (PSTN)), a satellite network, a low power network, a private network, a cloud-based computing network, an ad hoc network, an intranet, the Internet, a fiber optic-based network, and/or a combination of these or other types of networks.

Client device 210 includes one or more devices capable of receiving, generating, storing, processing, and/or providing information associated with a point-of-sale. For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), or a similar type of device that utilizes information associated with vending device 240. In some implementations, client device 210 may provide, for display, a user interface including analytics information regarding vending device 240. In some implementations, client device 210 may provide, for display a management user interface associated with controlling a group of vending devices 240, user devices 250, or the like. In some implementations, client device 210 may receive information from and/or transmit information to another device in environment 200.

Cloud server 220 includes one or more devices capable of storing, processing, and/or routing information associated with a point-of-sale. For example, cloud server 220 may include a server that is associated with controlling a group of vending devices 240, providing information regarding the group of vending devices 240, or the like. In some implementations, cloud server 220 may include a communication interface that allows cloud server 220 to receive information from and/or transmit information to other devices in environment 200. Cloud server 220 is described herein, in detail, with regard to FIG. 5. While cloud server 220 is described as a resource in a cloud computing network, such as cloud network 230, cloud server 220 may operate external to a cloud computing network, in some implementations. For example, cloud server 220 may be a server operating via a local network or data center, thereby permitting a user of cloud server 220 to avoid storing data via cloud network 230.

Cloud network 230 includes an environment that delivers computing as a service, whereby shared resources, services, etc. may be provided by cloud server 220 to store, process, and/or route information associated with a point-of-sale. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks.

In some implementations, cloud server 220 and/or cloud network 230 may be configured via one or more virtual networks. For example, a virtual cloud network 230 may be established that includes one or more assignable computing resources of cloud server 220. In some implementations, virtual cloud network 230 may include multiple portions to connect to devices of environment 200, such as one or more client devices 210, one or more vending devices 240, one or more user devices 250, or the like. In some implementations, virtual cloud network 230 may connect to one or more other resources, such as a set of reference data structures storing information, such as a weather data reference data structure, an event data reference data structure, or the like. In some implementations, virtual cloud network 230 may perform routing of information, such as routing of sensor data, routing of instructions, or the like.

Vending device 240 may include one or more devices or apparatuses capable of receiving, generating, storing, processing, and/or providing information associated with a point-of-sale. For example, vending device 240 may include a vending machine, a CDE, a cooler, an automat, or the like. In some implementations, vending device 240 may be a type of dispensing device that includes one or more communication and/or computing devices (e.g., a network connected dispensing device). A dispensing device may refer to a device that dispenses a product (e.g., a food product, a drink product, an electronics product, or a reward product), a service (e.g., a game service, a document service, or a storage service), or the like.

In some implementations, vending device 240 may include a refrigerated storage unit to house one or more items of product for dispensing. In some implementations, vending device 240 may include a set of sensors, such as a temperature sensor, an image sensor, a motion sensor, or the like. In some implementations, vending device 240 may include a set of integrated communication and/or computing devices, a set communication and/or computing devices installed into a legacy vending machine, or the like. Vending device 240 is described herein, in detail, with regard to FIG. 4. In some implementations, vending device 240 may receive information from and/or transmit information to another device in environment 200.

User device 250 may include one or more devices capable of receiving, generating, storing, processing, and/or providing information associated with a point-of-sale. For example, user device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 250 may receive information from and/or transmit information to another device in environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
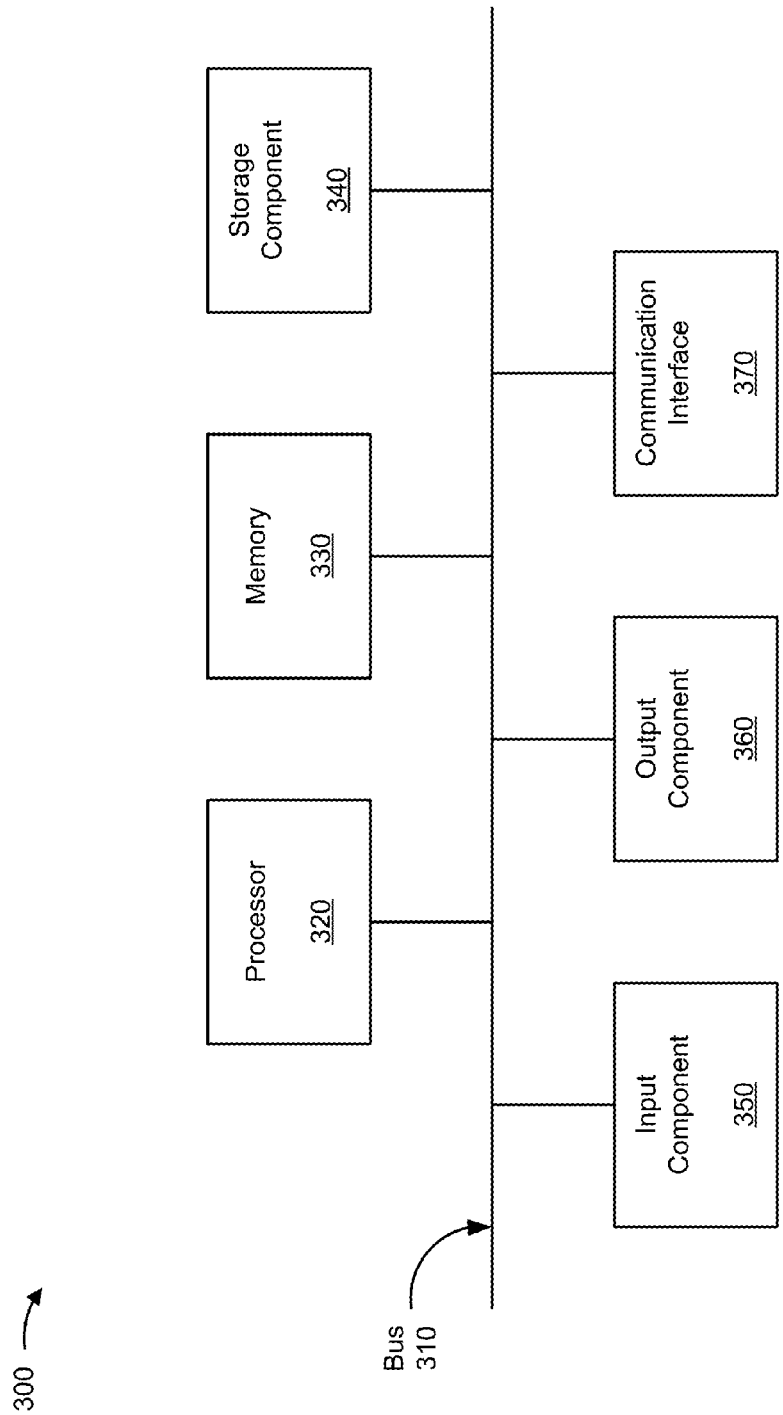
FIG. 3 is a diagram of example components of one or more devices of FIG. 2.

FIG. 3 is a diagram of example components of a device 300. Device 300 may correspond to client device 210, cloud server 220, vending device 240, and/or user device 250. In some implementations, client device 210, cloud server 220, vending device 240, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
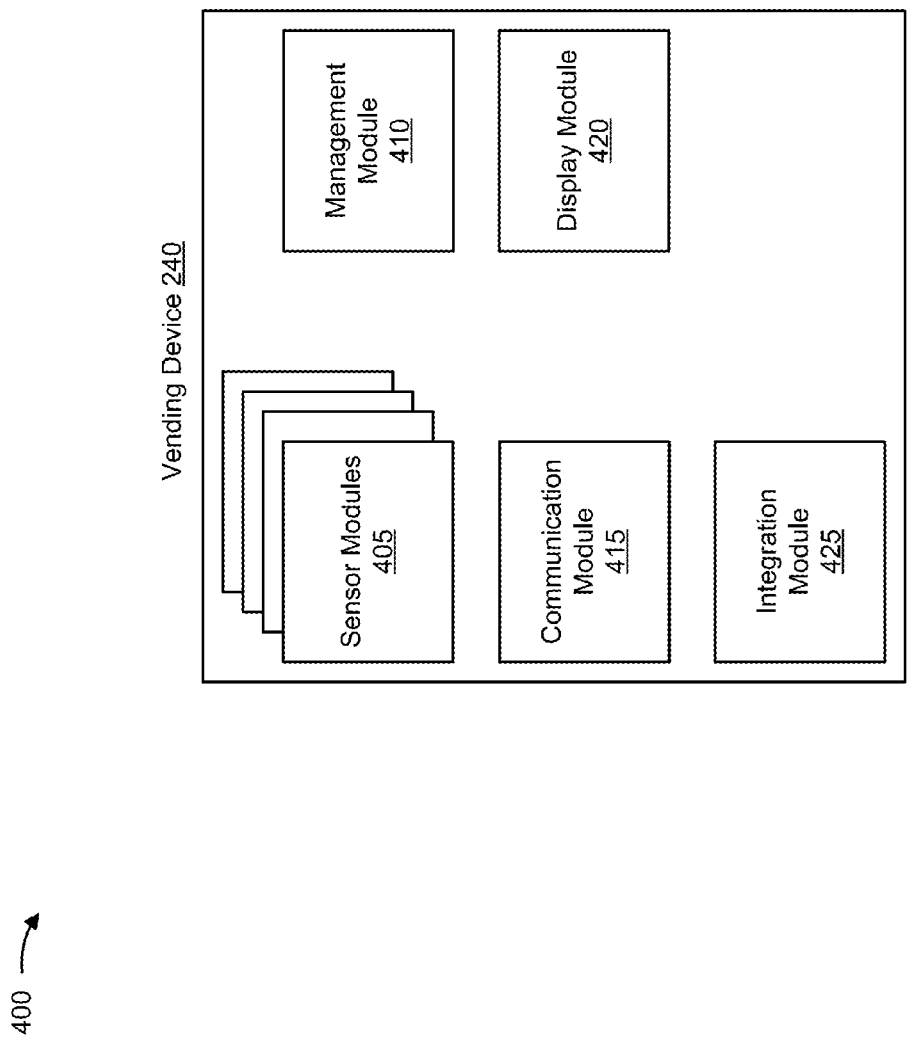
FIG. 4 is a diagram of example modules relating to the vending device shown in FIG. 2.

FIG. 4 is a diagram of an example implementation 400 showing example modules of vending device 240. As shown in FIG. 4, vending device 240 may include one or more sensor modules 405 (hereinafter referred to individually as "sensor module 405," and collectively as "sensor modules 405), a management module 410, a communications module 415, a display module 420, and an integration module 425.

Sensor module 405 includes one or more sensor devices to obtain sensor data. For example, sensor module 405 may include a motion sensor (e.g., to determine whether a cooler door of vending device 240 is opened, whether a product is removed from vending device 240, or whether a person is located in proximity to vending device 240), a temperature sensor (e.g., a cooler temperature sensor or an ambient temperature sensor), a light sensor (e.g., to determine whether a store in which vending device 240 is located is open or to determine whether a light associated with vending device 240 is operating), a location sensor (e.g., to determine a location of vending device 240), an image sensor (e.g., to determine whether a product is removed from vending device 240 or to determine a purity of products stored inside vending device 240), or the like. Additionally, or alternatively, sensor module 405 may include one or more sensors associated with determining a power consumption of vending device 240 (e.g., to determine a cost of operation of vending device 240), a vibration metric associated with vending device 240 (e.g., to identify a component malfunction of a component of vending device 240), a set of health sensors (e.g., to determine whether a component is malfunctioning, such as a sensor to determine whether is bill validator is operating or a sensor to determine whether display module 420 is operating), or the like.

In some implementations, sensor module 405 may perform data collection at a particular interval based on receiving information from management module 410. For example, sensor module 405 may be caused to collect sensor data continuously (e.g., in real-time or near-real time at a relatively short interval, such as each millisecond or each second), periodically (e.g., at a relatively longer interval, such as each hour, each day, or each week), or the like. In some implementations, a first sensor module 405 may perform data collection on a first interval and a second sensor module 405 may perform data collection on a second interval. In some implementations, sensor module 405 may include a communication interface that permits management module 410 to communicate with a set of original equipment manufacturer (OEM) sensors, such as a set of sensors integrated into vending device 240 at a manufacturing stage (e.g., a temperature sensor or a sensor identifying a quantity of items of product). Additionally, or alternatively, sensor module 405 may include a set of aftermarket sensors, such as a motion detector sensor or a power management sensor integrated into a legacy vending device 240. In some implementations, one or more sensors may be located within or integrated into vending device 240. Additionally, or alternatively, one or more sensors may be external to vending device 240 and may communicate with vending device 240.

Management module 410 includes one or more components to operate modules of vending device 240. For example, management module 410 may cause sensor module 405 to perform data collection of sensor data. In some implementations, management module 410 may process data to identify and perform a response action. For example, management module 410 may receive sensor data indicating a quantity of items of product stored via vending device 240, and may cause display module 420 to provide an offer (e.g., a discount on a type of item of product) based on the quantity of items of product. In some implementations, management module 410 may dynamically alter prices of products offered by vending device 240 based on data obtained by management module 410 (e.g., demand data, supply data, or restocking data, such as a predicted amount of time before a technician will arrive at vending device 240 to perform restocking, a predicted set of items of product that are able to be restocked, or the like).

Additionally, or alternatively, management module 410 may receive sensor data regarding a power consumption of vending device 240, an ambient temperature associated with vending device 240 (e.g., determined based on an external temperature sensor), or a predicted weather condition (e.g., a predicted temperature) at an area including vending device 240. In this case, management module 410 may identify an optimization to a utilization of a compressor to maintain an internal temperature that satisfies a threshold, and may cause integration module 425 to adjust the utilization of the compressor based on the optimization. Additionally, or alternatively, management module 410 may receive data from cloud server 220 associated with causing vending device 240 to provide an advertisement to user devices 250 within a particular proximity of vending device 240. In this case, management module 410 may cause communications module 415 to identify a particular user device 250 within the particular proximity, and provide the advertisement for display via the particular user device 250.

In some implementations, management module 410 may include a set of submodules, such as an image processor module (e.g., to process image data from an image sensor and identify an item in the image, an orientation of the item in the image, or a customer in the image). In some implementations, management module 410 may perform a transaction. For example, management module 410 may detect input (e.g., via a user interface) associated with requesting that vending device 240 dispense a particular item of product, may perform a transaction based on the input, may cause the item to be dispensed, and may cause communications module 415 to provide information identifying the transaction to cloud server 220. In some implementations, management module 410 may automatically perform the transaction. For example, management module 410 may identify user device 250 (e.g., based on establishing a connection to user device 250) or a user of user device 250 (e.g., based on an image recognition of the user), may obtain transaction information relating to the user, and may perform the transaction to dispense a particular item of product for the user.

Communications module 415 includes one or more components to communicate with another device. For example, communications module 415 may connect vending device 240 to user device 250 via a local area network (LAN) connection to obtain information identifying a user of user device 250. In this case, management module 410 may cause a particular advertisement to be provided for display via display module 420 based on the information identifying the user, such as an advertisement for a type of item of product that the user frequently consumes, an offer of a discount on an item of product, or the like. In some implementations, communications module 415 may identify a beacon (e.g., a Bluetooth beacon) to determine that a particular user device 250 is within a particular proximity. In this case, communications module 415 may provide information to management module 410 indicating that the particular user device 250 is within the particular proximity, and management module 410 may cause a response action to be performed.

In some implementations, communications module 415 may connect vending device 240 to cloud server 220 to provide information, such as sensor data from sensor module 405. For example, communications module 415 may utilize a network connection (e.g., a cellular network connection or a Wi-Fi network connection) to connect to cloud server 220. Additionally, or alternatively, communications module 415 may utilize a LAN connection to user device 250 to transmit information to cloud server 220 (e.g., via user device 250). Additionally, or alternatively, communications module 415 may provide information utilizing another type of connection, such as an Ethernet connection, a near field communication (NFC) connection, or the like. In this way, communications module 415 permits vending device 240 to communicate with cloud server 220 when another network connection, such as a Wi-Fi connection is unavailable.

Display module 420 includes one or more components to provide a display for vending device 240. For example, display module 420 may include a display attached to vending device 240 or integrated into a housing of vending device 240. In some implementations, management module 410 may cause display module 420 to provide an advertisement, an offer, a status update (e.g., a temperature of a beverage stored within vending device 240), or the like. In some implementations, management module 410 may cause display module 420 to provide information not related to vending device 240, such as an advertisement for another product, a weather update, a sports update, an entertainment program, news, or the like. For example, management module 410 may receive information indicating that a particular user of user device 250 is a fan of a particular sports franchise, and may cause a sports score associated with the particular sports franchise to be provided for display via display module 420.

In some implementations, display module 420 may provide an offer for sale of a particular type of item of product targeted to a user. For example, when management module 410 receives information identifying a user within a particular proximity to vending device 240, management module 410 may cause display module 420 to provide an offer targeted to the user based on one or more stored user preferences (e.g., an offer regarding a preferred item of product of a set of available products of vending device 240). In some implementations, display module 420 may provide location-specific information for display, such as an advertisement for a nearby event, store, or restaurant, or an offer for sale of a particular item of product related to a location of vending device 240. For example, management module 410 may determine that fans of a first sports team prefer a first type of soft drink and fans of a second sports team prefer a second type of soft drink. In this case, display module 420 may provide an offer for sale of the first type of soft drink when management module 410 determines that the first sports team is to play at a nearby stadium, and may provide an offer for sale of the second type of soft drink when management module 410 determines that the second sports team is to play at the nearby stadium.

Integration module 425 includes one or more components to integrate management module 410 into vending device 240 (e.g., to control a group of configurable components of vending device 240 based on an instruction from management module 410). For example, integration module 425 may include a set of controllers or actuators to control vending device 240, such as a power management module (e.g., a power management controller to control a power management configuration of vending device 240), a compressor module (e.g., a compressor controller to control utilization of a compressor component and to cause an alteration to an internal temperature of vending device 240), a door lock actuator, or the like. In some implementations, integration module 425 may include a communication interface associated with causing one or more communications to be exchanged between management module 410 and one or more controllers or actuators of vending device 240. In some implementations, integration module 425 may alter functionality of vending device 240. For example, integration module 425 may cause a compressor to be activated, deactivated, or the like based on receiving information from management module 410. Similarly, integration module 425 may cause a light included in vending device 240 to be activated, deactivated, or the like.

The number and arrangement of modules shown in FIG. 4 are provided as an example. In practice, there may be additional modules, fewer modules, different modules, or differently arranged modules than those shown in FIG. 4. Furthermore, two or more modules shown in FIG. 4 may be implemented within a single module, or a single module shown in FIG. 4 may be implemented as multiple, distributed modules. Additionally, or alternatively, a set of modules of vending device 240 may perform one or more functions described as being performed by another set of modules of vending device 240.

Figure 5:
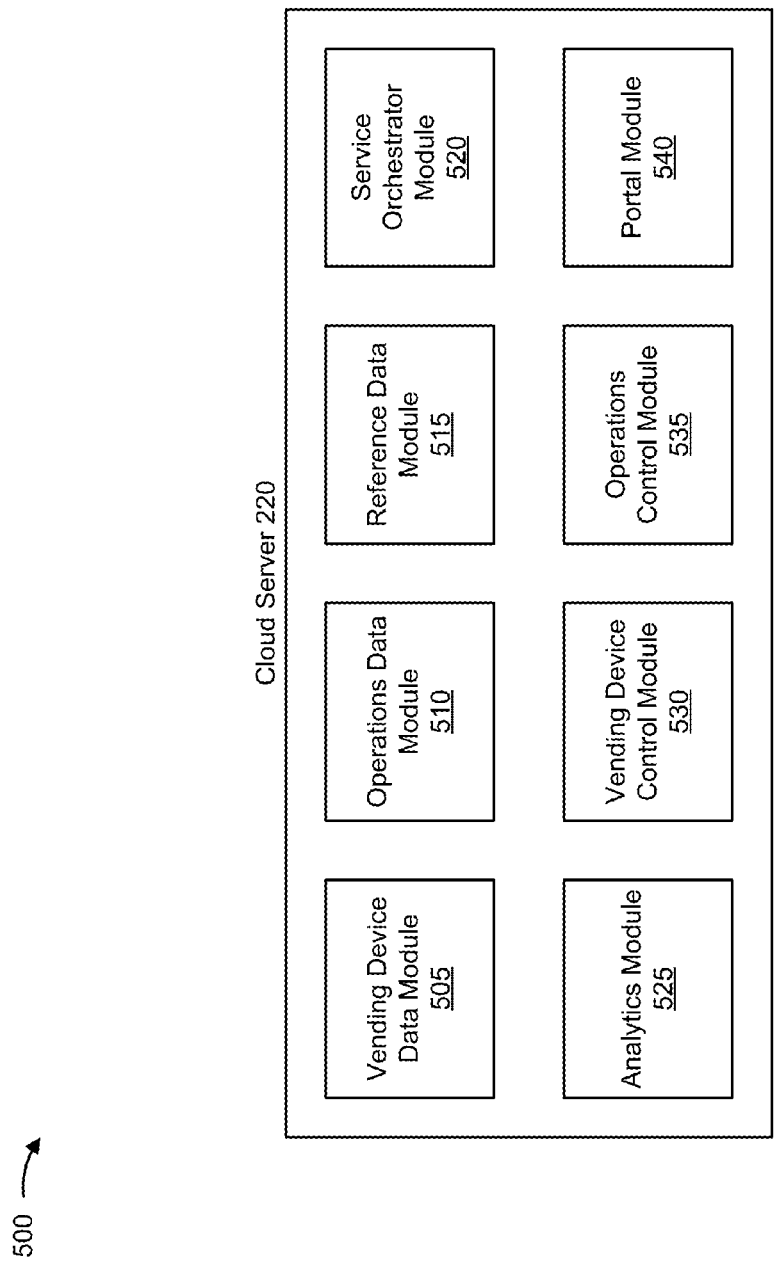
FIG. 5 is a diagram of example modules relating to the cloud server shown in FIG. 2.

FIG. 5 is a diagram of an example implementation 500 showing example modules of cloud server 220. As shown in FIG. 5, cloud server 220 may include a vending device data module 505, an operations data module 510, a reference data module 515, a service orchestrator module 520, an analytics module 525, a vending device control module 530, an operations control module 535, and a portal module 540.

Vending device data module 505 operates one or more computing resources and is associated with obtaining data from vending device 240. For example, vending device data module 505 may obtain sensor data from vending device 240 (e.g., via a network connection to vending device 240 or via a network connection to a particular user device 250 that is connected via a LAN connection to vending device 240). In some implementations, vending device data module 505 may perform data collection for a particular vending device 240 on a particular interval, such as a real-time or near real-time interval, a periodic interval, or the like. In some implementations, vending device data module 505 may perform a processing technique to obtain information from data obtained from vending device 240. For example, vending device data module 505 may include a submodule (e.g., a location determination module) that utilizes obtained information identifying an Internet protocol (IP) address of vending device 240 to determine an estimated location of vending device 240 based on the IP address. In this case, vending device data module 505 may provide the estimated location of vending device 240 for processing by analytics module 525 rather than providing information identifying the IP address.

In some implementations, vending device data module 505 may cause a message to be transmitted to user device 250 relating to obtaining vending device data from vending device 240. For example, vending device data module 505 may indicate to portal module 540 that data is to be obtained from vending device 240, and may cause portal module 540 to provide a user interface for display via user device 250. In this case, the user interface may be associated with causing a user of user device 250 to complete a survey regarding vending device 240 or the like. Additionally, or alternatively, vending device data module 505 may cause a message to be transmitted to user device 250 to alter a type of data that is collected, an interval with which data is collected, or the like.

Operations data module 510 operates one or more computing resources and is associated with obtaining operations data from user device 250. For example operations data module 510 may obtain data regarding a location of user device 250 (e.g., a location of a technician's vehicle or an inspector's vehicle), items of product being stored (e.g., via a storage unit associated with user device 250, such as a warehouse, a technician's vehicle, or an inspector's vehicle), or the like. Additionally, or alternatively, operations data module 510 may obtain other operations data, such as information identifying a schedule of inspections that are to be performed by an inspector, a set of repair appointment entries stored in a calendar of a particular user device 250 utilized by a technician, or the like.

Reference data module 515 operates one or more computing resources and is associated with obtaining reference data associated with managing a group of vending devices 240. For example, reference data module 515 may obtain data regarding a set of store hours for a store at which vending device 240 is located, weather data for an area including one or more vending devices 240, event data for a location within a particular proximity to a particular vending device 240, or the like. In some implementations, reference data module 515 may obtain data from a public data source (e.g., a government data source, such as a weather data source or the like, or a calendar data source, such as an event calendar or the like), a proprietary data source (e.g., a proprietary data source providing a schedule for manufacturing replacement parts or hiring of employees), or the like. In some implementations, reference data module 515 may obtain real-time or near-real time data (e.g., which service orchestrator module 520 may utilize to identify a status of a particular vending device 240). In some implementations, reference data module 515 may obtain historic data (e.g., which service orchestrator module 520 may utilize to identify a trend, a relationship, a correlation, or the like relating to one or more vending devices 240).

Service orchestrator module 520 operates one or more computing resources and is associated with managing a group of vending devices 240. For example, service orchestrator module 520 may cause one or more modules of cloud server 220 to obtain data, process data, provide instructions, or the like. In some implementations, service orchestrator module 520 may select one or more response actions. For example, service orchestrator module 520 may process input data from vending device data module 505, operations data module 510, and/or reference data module 515 to identify a response action associated with causing a cost reduction, a power utilization reduction, a component failure reduction, or the like. In this case, service orchestrator module 520 may cause vending device control module 530 and/or operations control module 535 to cause the response action to be implemented (e.g., by transmitting an instruction to vending device 240 or user device 250). In some implementations, service orchestrator module 520 may utilize information obtained from analytics module 525. For example, when analytics module 525 generates predictive analytics regarding a supply chain of items of product, a predicted failure of a component, a predicted likelihood of success of an offer for sale, or the like, service orchestrator module 520 may select a response action based on the predictive analytics, and cause the response action to be implemented.

In some implementations, service orchestrator module 520 may perform one or more management operations for a virtual network that includes cloud server 220 (e.g., cloud network 230). For example, service orchestrator module 520 may cause data collection to be performed on a particular interval, may cause data to be routed from a particular vending device 240 to client device 210 (e.g., for display via a user interface), or the like. In this case, cloud server 220 may receive the sensor data (e.g., via vending device data module 505), may process the data (e.g., via analytics module 525), and may provide processed sensor data to client device 210 for display via a user interface.

Analytics module 525 operates one or more computing resources and is associated with generating analytics information. For example, analytics module 525 may generate, based on vending device data, operations data, and/or reference data, analytics information associated with a previous utilization of a group of vending devices 240 (e.g., a quantity of sales or component failures during a previous time interval), a current utilization of the group of vending devices 240 (e.g., a status of a group of vending devices 240, such as whether each vending device 240 is turned on, is turned off, or is associated with a malfunction), or a predicted utilization of the group of vending devices 240 (e.g., a predicted sales metric or a predicted component failure rate for a group of vending devices 240). In some implementations, analytics module 525 may generate analytics information (e.g., predictive analytics) regarding operations associated with a group of vending devices 240. For example, analytics module 525 may identify a correlation between inspection of a group of vending devices 240 and sales of the group of vending devices 240. In this case, service orchestrator module 520 may select a response action (e.g., altering an inspection schedule) to increase a frequency with which one or more inspectors are dispatched to inspect the group of vending devices 240. Additionally, or alternatively, service orchestrator module 520 may be caused to recommend a promotion for an inspector based on analytics module 525 identifying the correlation. Additionally, or alternatively, analytics module 525 may predict a reduction in cost or increase in sales associated with altering a supply chain or inventory level, and may cause service orchestrator module 520 to cause the alteration to the supply chain or inventory level.

Vending device control module 530 operates one or more computing resources and is associated with controlling one or more vending devices 240. For example, vending device control module 530 may transmit information to vending device 240 to cause vending device 240 to alter a configuration, such as altering a power management configuration, altering an offer for sale, altering an internal temperature of vending device 240, or the like. In some implementations, vending device control module 530 may alter a data collection configuration. For example, vending device control module 530 may cause vending device 240 to collect data with a particular frequency.

In some implementations, vending device control module 530 may cause vending device 240 to collect data at a near real-time time interval (e.g., a frequency associated with continuous or near-continuous collection and reporting of sensor data, such as each second or each minute). In some implementations, vending device control module 530 may cause vending device 240 to collect first data at a first time interval (e.g., a non near real-time time interval for data expected to remain relatively static, such as location data) and second data at a second time interval (e.g., a near real-time time interval for data expected to be relatively dynamic, such as vibration data). In some implementations, vending device control module 530 may cause a first vending device 240 to collect data at a first time interval and a second vending device 240 to collect data at a second time interval (e.g., based on a prioritization of vending devices 240, a bandwidth of a set of connections to a set of vending devices 240, locations of vending devices 240, or a type of data being collected from the set of vending devices 240).

Operations control module 535 operates one or more computing resources and is associated with controlling operations relating to one or more vending devices 240. For example, operations control module 535 may transmit information to user device 250 to cause an inspector, a technician, or the like to be deployed for a particular vending device 240. Additionally, or alternatively, operations control module 535 may transmit information to user device 250 to cause a set of products stored inside a vehicle for restocking to be altered (e.g., to cause additional items of product, fewer items of product, or different items of product to be stored), thereby reducing a likelihood that restocking personnel lack the correct products to restock a particular vending device 240.

Portal module 540 operates one or more computing resources and is associated with providing information associated with a group of vending devices 240. For example, portal module 540 may generate a user interface, and may provide information via the user interface. In some implementations, portal module 540 may generate a user interface and cause the user interface to be displayed via user device 250. For example, portal module 540 may generate a questionnaire regarding a status of a particular vending device 240 for display via a user interface, and may receive an indication of one or more interactions with the user interface associated with selecting responses to the questionnaire. In some implementations, portal module 540 may generate a user interface with multiple sets of user interface elements and cause the user interface to be displayed via client device 210. For example, portal module 540 may generate a user interface including a first set of user interface elements to provide analytics information (e.g., determined by analytics module 525), a second set of user interface elements to provide a recommendation for altering vending device 240 or a recommendation for altering operations associated with vending device 240, a third set of user interface elements to receive user input, or the like. In this case, portal module 540 may provide the user interface to client device 210 for display, and may receive an indication that a recommendation is to be implemented by service orchestrator module 520 based on a user interaction with the user interface.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules of cloud server 220 may perform one or more functions described as being performed by another set of modules of cloud server 220.

FIG. 6 is a flow chart of an example process 600 for managing a group of vending devices. In some implementations, one or more process blocks of FIG. 6 may be performed by cloud server 220. In some implementations, one or more process blocks of FIG. 6 may be performed by another device or a group of devices separate from or including cloud server 220, such as client device 210, vending device 240, and/or user device 250.

As shown in FIG. 6, process 600 may include obtaining data relating to a vending device (block 610). For example, cloud server 220 may obtain data relating to vending device 240. In some implementations, cloud server 220 may obtain vending device data relating to vending device 240 from vending device 240. For example, cloud server 220 may obtain sensor data, such as image sensor data, regarding a purity metric associated with vending device 240. A purity metric may refer to a metric regarding an extent to which utilization of vending device 240 corresponds to an intended utilization of vending device 240. For example, storage of competitor items of product in vending device 240 may correspond to a relatively low purity, and storing items of product associated with a vending device provider of vending device 240 may correspond to a relatively high purity. Similarly, storing items of product in vending device 240 with labels facing away from a customer may correspond to a relatively low purity, and storing items of product with labels facing toward the customer may correspond to a relatively high purity. Additionally, or alternatively, cloud server 220 may obtain other sensor data, such as vibration data (e.g., obtained from a vibration sensor), temperature data, utilization data, health data (e.g., whether one or more components are malfunctioning), or the like. In some implementations, cloud server 220 may obtain sensor data from a group of vending devices 240, such as a group of vending devices 240 associated with a common area, a common type of item of product, or the like.

In some implementations, cloud server 220 may pre-process the vending device data to obtain one or more metrics regarding the vending device. For example, cloud server 220 may perform an image analysis, such as a pattern recognition technique, a machine learning technique, or the like, to process an image of contents of vending device 240 to determine, for example, a purity metric relating to the contents of vending device 240 (e.g., an orientation of items for dispensing or an identification of items stored inside vending device 240). Additionally, or alternatively, cloud server 220 may perform the image analysis to determine an identification of a customer, or a potential customer, within a particular proximity of vending device 240 (e.g., for advertisement targeting or offer targeting). Additionally, or alternatively, cloud server 220 may perform a correlation technique to correlate a first metric to a second metric. For example, cloud server 220 may determine a correlation between vibration data and temperature data to determine that a compressor of vending device 240 is operating.

In some implementations, cloud server 220 may obtain data regarding operations associated with vending device 240. For example, cloud server 220 may obtain operations data regarding a location of a vehicle that includes user device 250, such as an inspector's vehicle, a technician's vehicle, or the like. Similarly, cloud server 220 may obtain operations data regarding a location of an inspector, a technician, or the like. In some implementations, cloud server 220 may obtain operations data regarding an inventory of items of product in a vehicle. For example, cloud server 220 may obtain data identifying the inventory, an image on which an image recognition technique may be performed to identify the inventory, or the like. Additionally, or alternatively, cloud server 220 may obtain operations data regarding an inventory of replacement components, an inventory of repair tools, or the like.

In some implementations, cloud server 220 may obtain the operations data from user device 250. For example, cloud server 220 may request location information from user device 250 and may receive the location information based on transmitting the request. Additionally, or alternatively, cloud server 220 may provide a user interface for display via user device 250. For example, cloud server 220 may generate a user interface identifying information that is to be provided (e.g., confirmation of a location of vending device 240, an amount of money collected by vending device 240, or an inventory of products stored in a restocking truck), and may receive operations information based on user device 250 detecting a user interaction with the user interface.

In some implementations, cloud server 220 may obtain reference data regarding one or more vending devices 240. For example, cloud server 220 may determine traffic data within a particular proximity of a group of technicians' vehicles (e.g., to determine a set of routes for restocking items of product or performing maintenance), weather data regarding a location of a particular vending device 240 (e.g., to predict sales for the particular vending device 240), event data regarding a location of a group of vending devices 240 (e.g., to select an offer of an item of product that corresponds to preferences of attendees of a particular event), or the like. Additionally, or alternatively, cloud server 220 may obtain reference data regarding an energy cost, a sales figure for a store, or the like. In this way, cloud server 220 may obtain information that may be utilized to identify a response action associated with causing a reduction in costs, an increase in sales, a reduction in time required to dispatch a technician to perform maintenance, or the like.

In some implementations, cloud server 220 may receive data based on vending device 240 perform processing of data. For example, vending device 240 may obtain data, such as vending device data, operations data, and/or reference data, and may select a response action. In this case, vending device 240 may provide information identifying the response action, a recommendation regarding implementation of the response action, information identifying a result of implementing the response action, or the like. In this way, a group of vending devices 240 perform distributed processing of data and reduce a utilization of network resources relative to each response action being selected by cloud server 220.

As further shown in FIG. 6, process 600 may include processing the data to identify a response action (block 620). For example, cloud server 220 may process the data to identify the response action. In some implementations, cloud server 220 may perform a particular processing technique to process the data. For example, cloud server 220 may perform a pattern recognition technique, a machine learning technique, a heuristic technique, a regression technique, an image processing technique (e.g., to process image sensor data), or the like. In some implementations, cloud server 220 may perform an optimization technique to optimize a set of parameters, such as a delivery route for a set of vehicles, a maintenance schedule for a group of technicians, or the like.

In some implementations, cloud server 220 may generate a data model with which to process the data. For example, cloud server 220 may utilize data regarding a group of vending devices 240, operations associated with the group of vending devices 240, reference data, or the like to generate one or more data models relating to sales via the group of vending devices 240, component failure for components of the group of vending devices 240, operations associated with the group of vending devices 240, or the like. In some implementations, cloud server 220 may generate a scoring metric relating to the data model. For example, cloud server 220 may generate a health status score for a vending device 240 based on sensor data relating to temperature, vibration, or the like, and may select one or more vending devices 240 associated with a threshold health status score. In this case, cloud server 220 may process data regarding a particular vending device 240 with data regarding the one or more vending devices 240 to identify an alteration to the particular vending device 240 to cause a health status of the particular vending device 240 to satisfy the threshold health status score.

In some implementations, cloud server 220 may process the data to identify a response action related to operations. For example, cloud server 220 may utilize customer preference data, product purity data, status data (e.g., regarding a group of vending devices 240), inventory data, and/or location data to predict a demand for an item of product at a particular location. In this case, cloud server 220 may identify an alteration to a delivery route, a set of items of product included in a delivery vehicle, or the like based on the predicted demand to reduce a likelihood of a user being unable to buy an item of product as a result of a particular vending device 240 being sold out of the particular item of product. Similarly, cloud server 220 may identify a response action associated with altering a deployment of vending devices 240, such as determining that a particular vending device 240 is to be moved from a first location to a second location to accommodate the predicted demand.

In some implementations, cloud server 220 may process the data to identify a response action related to a supply chain. For example, cloud server 220 may determine that a first type of item of product is to be produced at an increased rate and a second type of item of product is to be produced at a decreased rate based on sales data obtained from vending devices 240. Similarly, cloud server 220 may determine that a first production facility is to produce a first type of item of product for distribution to a first group of vending devices 240 and a second production facility is to produce a second type of product for distribution to a second group of vending devices 240 based on a predicted demand for the first type of item of product and the second type of item of product. In this way, cloud server 220 reduces a distance that an item of product must be delivered to meet customer demand relative to statically producing the item of product without accounting for a dynamic alteration to customer demand.

In some implementations, cloud server 220 may process the data to identify a response action related to inspection of vending devices 240. For example, when cloud server 220 determines that a purity metric for a particular vending device 240 satisfies a threshold based on a threshold percentage of items of product being associated with labels facing away from customers, cloud server 220 may identify a response action related to deploying an inspector to perform an action (e.g., to alter the stocking of a particular vending device 240). In this way, cloud server 220 may deploy the inspector to cause products to be displayed with labels facing outward toward potential customers. Similarly, cloud server 220 may identify a response action associated with deploying an inspector to cause competitor products to be removed from the particular vending device 240.

In some implementations, cloud server 220 may identify a response action related to a repair of vending device 240. For example, based on receiving sensor data from vending device 240 indicating that a temperature satisfies a threshold, cloud server 220 may determine that one or more technicians are to be deployed to inspect and/or repair vending device 240. In this case, cloud server 220 may utilize operations data to select a particular technician based on a location, an inventory of components stored in a repair vehicle utilized by the particular technician, a competency of the technician (e.g., a set of skills or a level of training), a schedule of other repairs assigned to the particular technician, a ranking of vending device 240 (e.g., an importance of vending device 240 relative to other vending devices 240 based on sales data or a business relationship with a store owner of a store at which vending device 240 is located), or the like. Similarly, cloud server 220 may select an inspector based on a location of the inspector, a traffic condition within a particular proximity of the inspector, or the like. In this way, cloud server 220 improves maintenance operations for management of vending devices 240 and customer experience with vending devices 240 relative to relying on periodic inspections to detect and repair malfunctions.

Additionally, or alternatively, based on receiving sensor data from vending device 240 indicating that another component is predicted to malfunction, cloud server 220 may identify a response action related to deploying a technician. For example, cloud server 220 may determine that particular sensor data, such as a light level of a display, a vibration level, or the like, satisfies a threshold, and may determine that satisfaction of the threshold corresponds with a threshold likelihood of a component malfunctioning within a particular period of time. In this case, cloud server 220 may identify a response action associated with deploying a technician to proactively inspect and/or repair vending device 240. Additionally, or alternatively, based on identifying a pattern with regard to component malfunction based on sensor data from a first group of vending devices 240, cloud server 220 may deploy a set of technicians to proactively repair the component before a component malfunction in a second group of vending devices 240 (e.g., that include the same or a similar component as the first group of vending devices 240). In some implementations, cloud server 220 may identify a response action related to deploying a technician based on other data, such as vending device data received via a user interface of user device 250 (e.g., utilized by a technician or an inspector). For example, cloud server 220 may receive data indicating a decline in sales for vending device 240 and an inspection report indicating a poor condition of vending device 240, and may deploy a technician to refurbish and/or replace vending device 240.

In some implementations, cloud server 220 may identify a response action related to an inspection of vending device 240. For example, based on receiving sensor data (e.g., location data) from vending device 240 indicating that vending device 240 has moved from a first location (e.g., an intended location) to a second location, cloud server 220 may determine that an inspector is to be deployed to the second location to verify a location of vending device 240 and/or cause vending device 240 to be returned to the first location. In this case, cloud server 220 may utilize operations data (e.g., location data regarding a group of user devices 250 utilized by a group of inspectors) to select a particular inspector, such as based on a location of the particular inspector, a schedule of the particular inspector, a relation of the inspector with a store location at which vending device 240 is located, or the like. In this way, cloud server 220 may improve asset tracking, thereby reducing a likelihood of lost or stolen vending devices 240, relative to utilizing periodic inspections to verify that vending devices 240 are not moved.

Additionally, or alternatively, based on data from an inspection of vending device 240 indicating that vending device 240 is unplugged from a power source, located in a poor location, is associated with a threshold purity level, or the like, cloud server 220 may identify a response action of deploying a sales representative to negotiate with a store owner regarding purity, a technician to verify that the power source is operating, or the like. For example, vending device 240 may determine that a sales representative is to be deployed to plug vending device 240 into the power source, relocate vending device 240, alter the products stored via vending device 240, or the like. Additionally, or alternatively, vending device 240 may determine that the sales representative is to be deployed to negotiate with an entity controlling a location of vending device 240, such as a store owner, a stadium operator, a school administrator, or the like.

In some implementations, cloud server 220 may identify a response action related to altering a configuration of vending device 240. For example, based on temperature data from vending device 240, reference temperature data for a location of vending device 240, event data identifying a quantity of people that are to be within a proximity of vending device 240, store data identifying a set of hours at which a location of vending device 240 is accessible, or the like, cloud server 220 may determine that vending device 240 is to be turned on at a particular time to ensure that a threshold temperature is satisfied when customers arrive at the location of vending device 240. In this case, cloud server 220 may identify a response action associated with causing an alteration to a power management configuration of vending device 240 to cause vending device 240 to be turned on at the particular time. In this way, cloud server 220 causes a reduction to a power consumption of vending device 240 relative to a static power management configuration, thereby reducing costs associated with operating vending device 240.

Similarly, cloud server 220 may determine an alteration to an offer of an item for sale. For example, based on data indicating that a technician is to restock a particular type of item of product within a threshold amount of time, cloud server 220 may determine that a discount to a price of the particular type of item of product is to be offered to cause the particular item of product to be sold out when the technician arrives. In this case, cloud server 220 may identify a response action associated with causing the discount to be offered via vending device 240. Additionally, or alternatively, cloud server 220 may determine an alteration to an advertisement provided via vending device 240, an alteration to a temperature of vending device 240, an alteration to a frequency of data collection and reporting performed by vending device 240, or the like.

In some implementations, cloud server 220 may identify a response action related to generating a user interface. For example, cloud server 220 may determine that a technician is to be deployed to repair a component of vending device 240, and may generate a user interface for user device 250 with which to receive a report from the technician regarding a status of vending device 240. Additionally, or alternatively, cloud server 220 may generate a user interface for utilization by an inspector, such as a user interface including information identifying a sales route, a set of issues with vending device 240 that are to be inspected and/or discussed with a store manager at a store in which vending device 240 is located, or the like.

In some implementations, cloud server 220 may identify a response action relating to providing analytics. For example, cloud server 220 may generate one or more reports regarding data received from vending device 240, user device 250, or another data source, and may determine that the one or more reports are to be provided for review by a technician, an inspector, a supervisor, an analyst, or the like. In this case, cloud server 220 may identify a response action of providing a report identify sensor data, a purity metric, sales data, alert effectiveness (e.g., a correlation between sales data and providing an alert to cause an inspection), a correlation between multiple groups of data entries (e.g., a correlation between the purity metric and the sales data or a correlation between temperature data and the sales data), or the like. In this way, cloud server 220 improves management of a group of vending devices 240 by identifying correlations between data entries, potential reductions in power consumption or cost, or the like.

In some implementations, cloud server 220 may identify a response action related to providing a recommendation for implementation. For example, cloud server 220 may identify one or more recommendations for reducing power consumption, such as a recommended alteration to a power management plan for vending device 240, and may determine that the recommendation is to be provided to a technician for review prior to implementation. Similarly, cloud server 220 may determine that a particular inspector is to be deployed based on an identified correlation between inspections performed by the particular inspector and an increase in sales at inspected vending devices 240. In this case, cloud server 220 may determine that a recommendation regarding deploying the particular inspector to inspect poorly performing vending devices 240 (e.g., vending devices 240 with lower than average sales) is to be provided to a supervisor for review prior to implementation of the recommendation. Additionally, or alternatively, cloud server 220 may determine that a particular response action is to be automatically implemented without review by a technician, an inspector, a supervisor, or the like.

As further shown in FIG. 6, process 600 may include causing the response action to be performed (block 630). For example, cloud server 220 may cause the response action to be performed. In some implementations, cloud server 220 may transmit information to vending device 240 to cause the response action to be performed. For example, cloud server 220 may transmit information identifying the response action to vending device 240 to cause vending device 240 to perform the response action. In this case, vending device

240 may receive the indication of the response action, and may cause the response action to be implemented.

In some implementations, cloud server 220 may cause the response action to be performed by causing vending device 240 to alter an availability of an item for dispensing. For example, cloud server 220 may cause vending device 240 to cause an item of product to be available for dispensing, unavailable for dispensing, or the like. Additionally, or alternatively, cloud server 220 may cause an alteration to an order with which items are provided for display via a user interface of vending device 240 (e.g., vending device 240 may cause a first item of a list to be moved to the last position of the list). Additionally, or alternatively, cloud server 220 may cause vending device 240 to provide dynamic pricing information relating to a set of items (e.g., an altered price or an altered offer). In some implementations, cloud server 220 may cause vending device 240 to alter a configuration of a component. For example, cloud server 220 may cause vending device 240 to alter a power management configuration, a compressor utilization, or the like. In some implementations, cloud server 220 may cause vending device 240 to provide an advertisement relating to an item stored inside vending device 240. Additionally, or alternatively, cloud server 220 may cause vending device 240 to provide another advertisement, such as a movie trailer, an event advertisement, or the like.

In some implementations, cloud server 220 may transmit information to user device 250 to cause the response action to be performed. For example, cloud server 220 may transmit information identifying a schedule, a work assignment, a product restocking assignment, a negotiation assignment, or the like to user device 250 to provide the information for display to a user (e.g., a technician or a sales representative). In this case, cloud server 220 may cause a calendar entry to be generated and stored via user device 250, a negotiation script for negotiating with a store owner to remove competitor products to be generated (e.g., utilizing a natural language generation tool) and provided via user device 250, or the like. Additionally, or alternatively, based on detecting a user interaction with a user interface, cloud server 220 may perform another response action. For example, when cloud server 220 causes an inspector to be deployed to verify a location of a particular vending device 240 and receives information indicating that the particular vending device 240 is missing, cloud server 220 may cause another vending device 240 to be scheduled for delivery to replace the missing vending device 240. In this way, cloud server 220 automatically manages deployment of a group of vending devices 240 and personnel associated with the group of vending devices 240.

In some implementations, cloud server 220 may transmit information to client device 210 to cause the response action to be performed. For example, cloud server 220 may transmit information identifying a set of metrics, a set of recommendations, or the like for display via a user interface of client device 210. In this case, based on detecting a user interaction with a user interface, cloud server 220 may cause the recommendation to be implemented. For example, cloud server 220 may transmit information to vending device 240, user device 250, or the like based on detecting the user interaction with the user interface associated with accepting the recommendation.

In some implementations, cloud server 220 may generate a set of alerts to cause the response action to be performed. For example, cloud server 220 may transmit an alert to user device 250 to indicate that an inspector utilizing user device 250 is to inspect a particular vending device 240. In this case, cloud server 220 may include information identifying a location of the particular vending device 240, directions for finding the particular vending device 240 (e.g., utilizing a route optimized based on traffic data), or the like. In this way, cloud server 220 causes an inspector to be deployed to inspect a vending device 240 in a reduced amount of time relative to the inspector utilizing a static inspection schedule and route.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
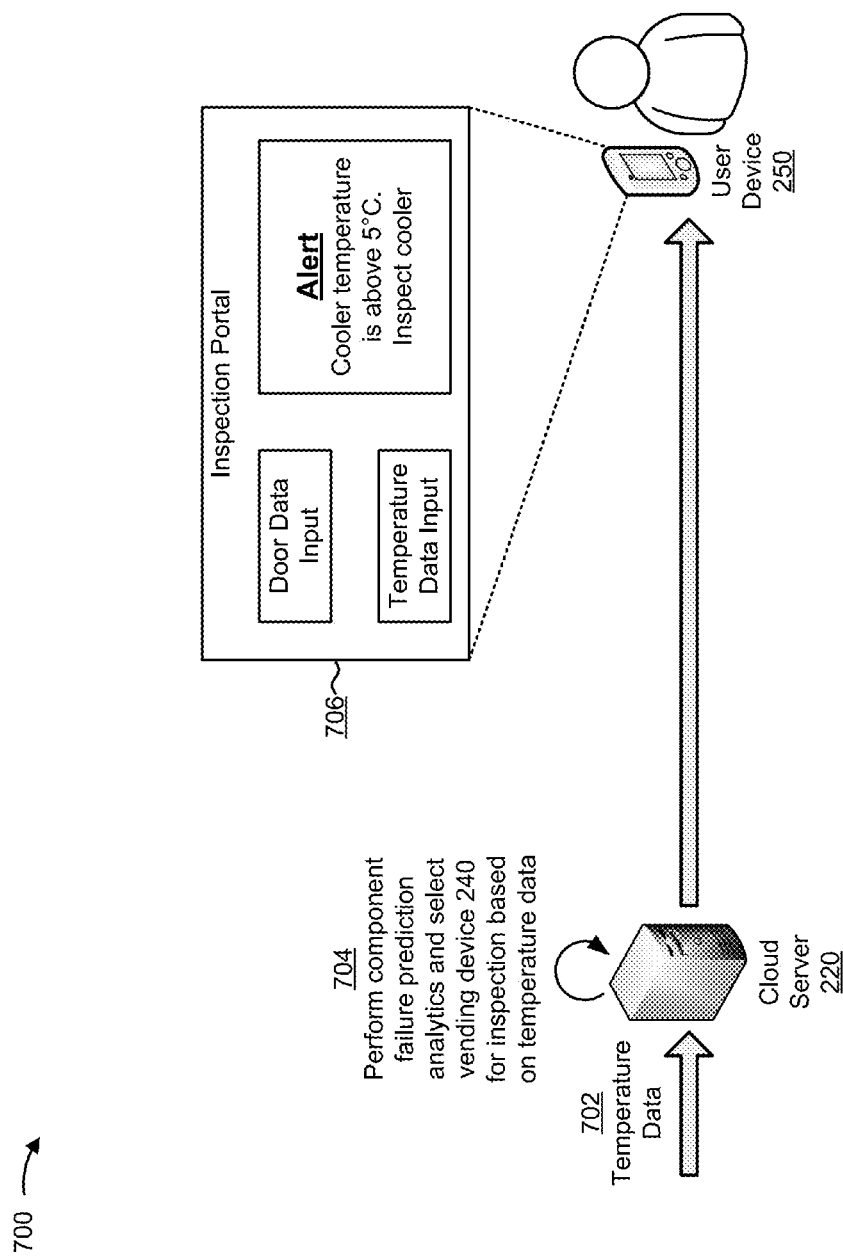
FIGS. 7A-7C are diagrams of an example implementation relating to the example process shown in FIG. 6.
Figure 7B:
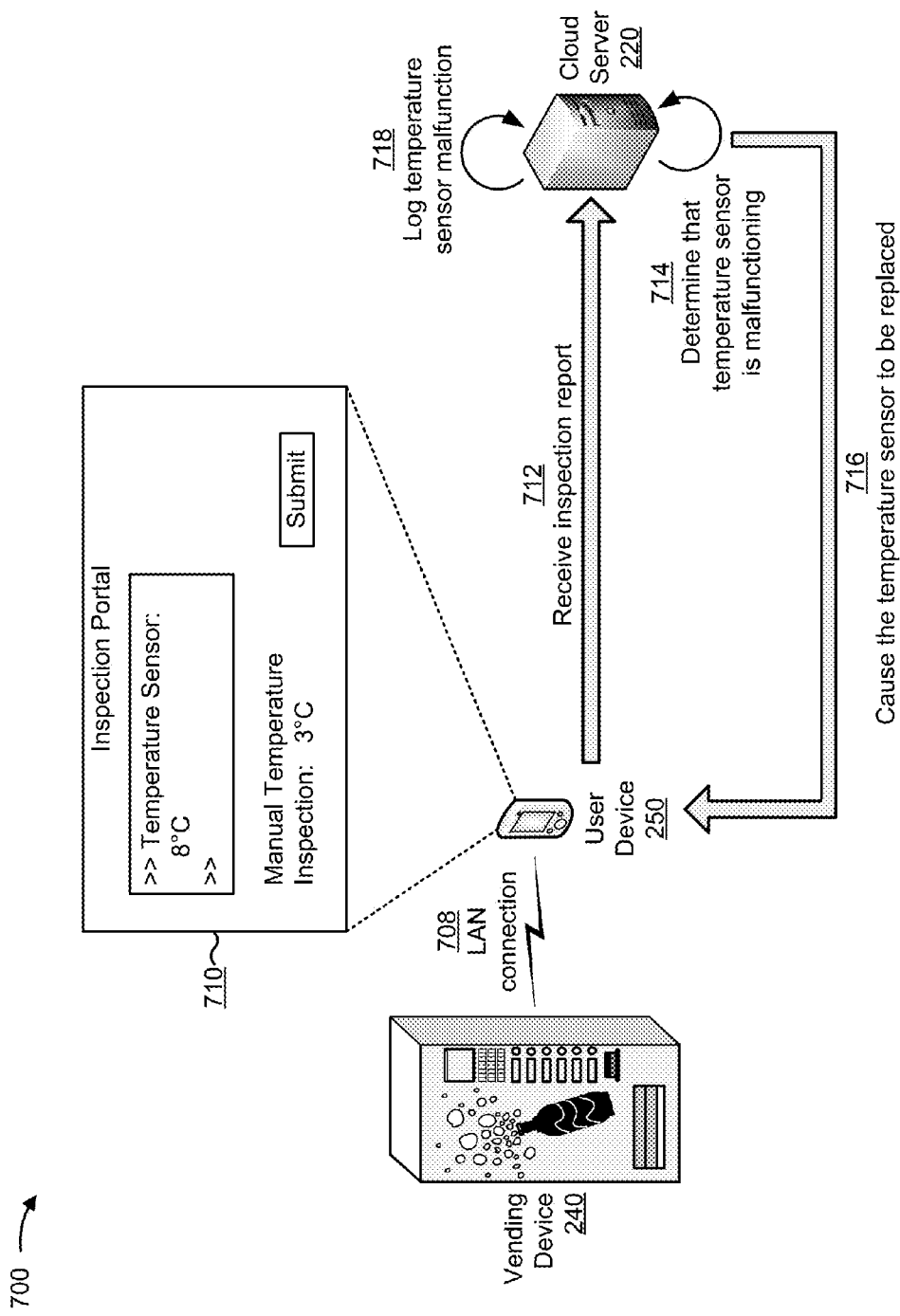
Figure 7C:
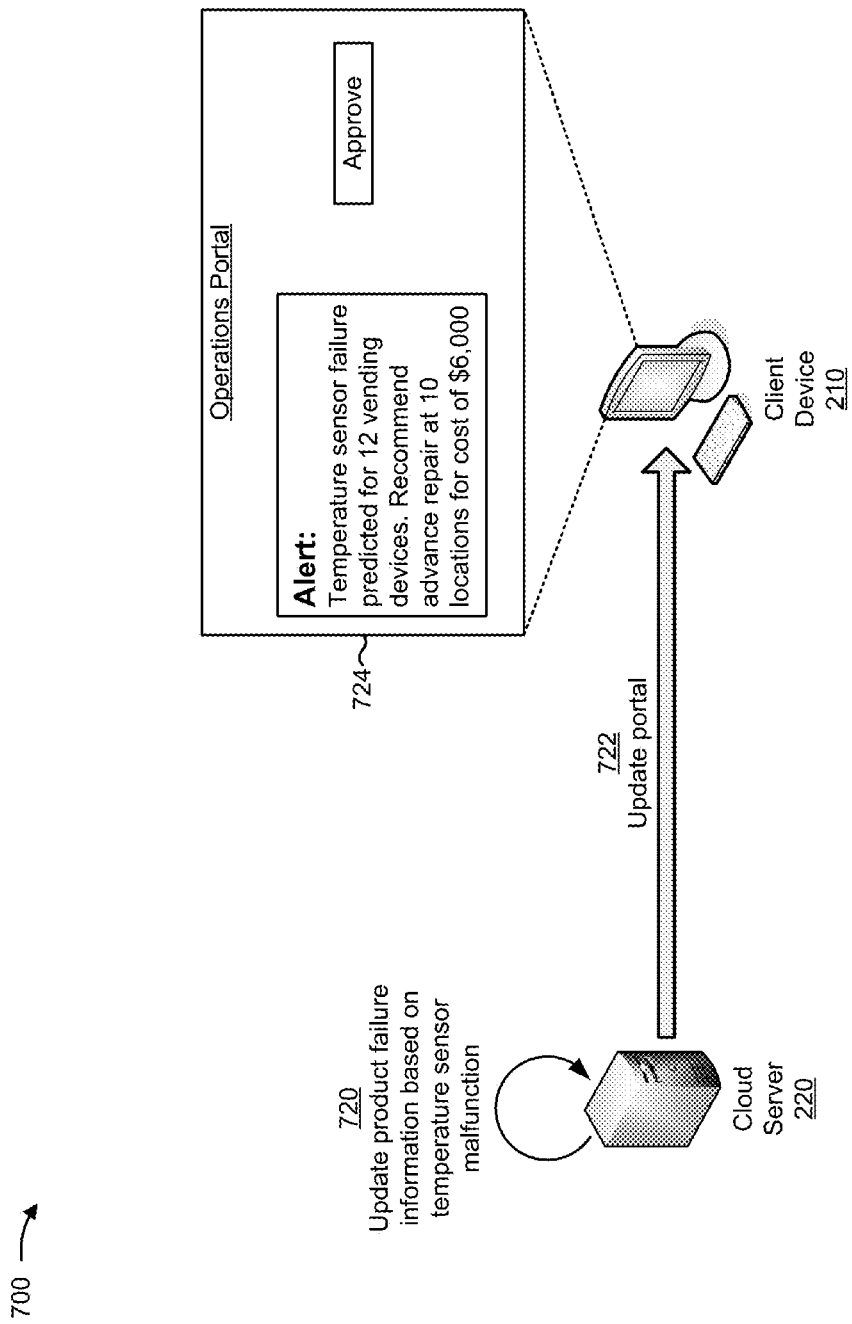

FIGS. 7A-7C are diagrams of an example implementation 700 relating to example process 600 shown in FIG. 6. FIGS. 7A-7C show an example of managing a group of vending devices.

As shown in FIG. 7A, and by reference number 702, cloud server 220 receives temperature data relating to a group of vending devices 240 (e.g., cloud server 220 receives the temperature data from the group of vending devices 240 based on the group of vending devices 240 utilizing a corresponding group of temperature sensors to obtain the temperature data). As shown by reference number 704, cloud server 220 determines that a particular vending device 240 is associated with an internal temperature satisfying a threshold, which is associated with a threshold likelihood of a component failure for vending devices 240, and determines that the particular vending device 240 is to be inspected based on the internal temperature satisfying the threshold. In this way, cloud server 220 utilizes temperature data obtained from a group of vending devices 240 (and data regarding component failure for vending devices 240) to identify a particular vending device 240 associated with a threshold likelihood of component failure.

As further shown in FIG. 7A, and by reference number 706, cloud server 220 generates a user interface associated with inspection of the particular vending device 240 and causes the user interface to be provided for display via user device 250. The user interface includes a first user interface element associated with providing an alert regarding the internal temperature of the particular vending device 240; a second user interface element associated with receiving data relating to a door of the particular vending device 240, such as data indicating whether the door is open, whether a door sensor is malfunctioning, or the like; and a third user interface element associated with receiving data relating to a temperature of the particular vending device 240 (e.g., an internal temperature), such as information verifying the temperature data, information indicating a malfunction with a temperature sensor, or the like.

Assume that based on causing the user interface to be provided for display via user device 250 (e.g., for display to an inspector associated with a vending device operator or provider), the inspector is caused to inspect the particular vending device 240 based on cloud server 220 causing the alert being provided via the user interface. In this way, vending device 240 utilizes sensor data (e.g., temperature sensor data) to cause a component failure to be predicted and an inspector to be dispatched to inspect vending device 240 automatically. Moreover, based on predicting the component failure proactively based on sensor data, cloud server 220 reduces an amount of time that vending device 240 remains in a malfunctioning state relative to requiring periodic inspections to identify the malfunctioning state.

As shown in FIG. 7B, and by reference number 708, when user device 250 is within a threshold proximity to the particular vending device 240, a LAN connection 708 is established between user device 250 and the particular vending device 240. The particular vending device 240 transmits data via LAN connection 708 for display. As shown by reference number 710, the user interface of user device 250 is caused to provide information indicating that a temperature sensor of the particular vending device 240 is determining that the particular vending device 240 is associated with an internal temperature of 8° C. Based on detecting a user interaction with a user interface, user device 250 may receive input indicating that a result of a manual temperature inspection (e.g., by the inspector) is an internal temperature of 3° C.

As further shown in FIG. 7B, and by reference number 712, cloud server 220 receives an inspection report identifying results of obtaining temperature data from the temperature sensor and the manual temperature inspection. As shown by reference number 714, based on the manual temperature inspection internal temperature and the temperature sensor internal temperature being different by a threshold amount, cloud server 220 determines that the temperature sensor of the particular vending device 240 is to be replaced. As shown by reference number 716, cloud server 220 transmits information to user device 250 to cause user device 250 to provide an alert that the temperature sensor of vending device 240 is to be replaced. In this way, cloud server 220 causes a component of vending device 240 to be replaced based on receiving data from vending device 240 (e.g., via user device 250). As shown by reference number 718, cloud server 220 logs a malfunction with the temperature sensor of the particular vending device 240. In this way, cloud server 220 stores information for utilization in performing analytics relating to proactively identifying malfunctioning components or components with a threshold likelihood of malfunctioning or failing within a particular period of time.

As shown in FIG. 7C, and by reference number 720, based on logging the malfunction with the temperature sensor of the particular vending device 240, cloud server 720 updates product failure information (e.g., a predictive model) associated with identifying a likelihood that a temperature sensor will malfunction, thereby permitting temperature sensor replacements to be performed proactively. As shown by reference number 722, cloud server 220 updates an operations portal user interface based on updating the product failure information. As shown by reference number 724, the operations portal user interface, generated by cloud server 220 and provided for display via client device 210, identifies a set of predicted temperature sensor failures for a set of vending devices 240, and provides a recommendation for repairing a set of temperature sensors based on the set of predicted temperature sensor failures. Based on detecting a user interaction associated with indicating an approval of the recommendation, cloud server 220 may automatically select a set of technicians, and transmit alerts to cause the set of technicians to be deployed to repair the set of temperature sensors. In this way, cloud server 220 reduces a likelihood that a temperature sensor fails (e.g., based on performing temperature sensor replacement prior to failure), thereby reducing an amount of lost profit resulting from soft drinks stored via vending devices 240 failing to be cooled to a temperature that is preferred by customers relative to performing temperature sensor replacements after a temperature sensor failure.

As indicated above, FIGS. 7A-7C are provided merely as an example. Other examples are possible and may differ from what was described with regard to FIGS. 7A-7C.

Figure 8A:
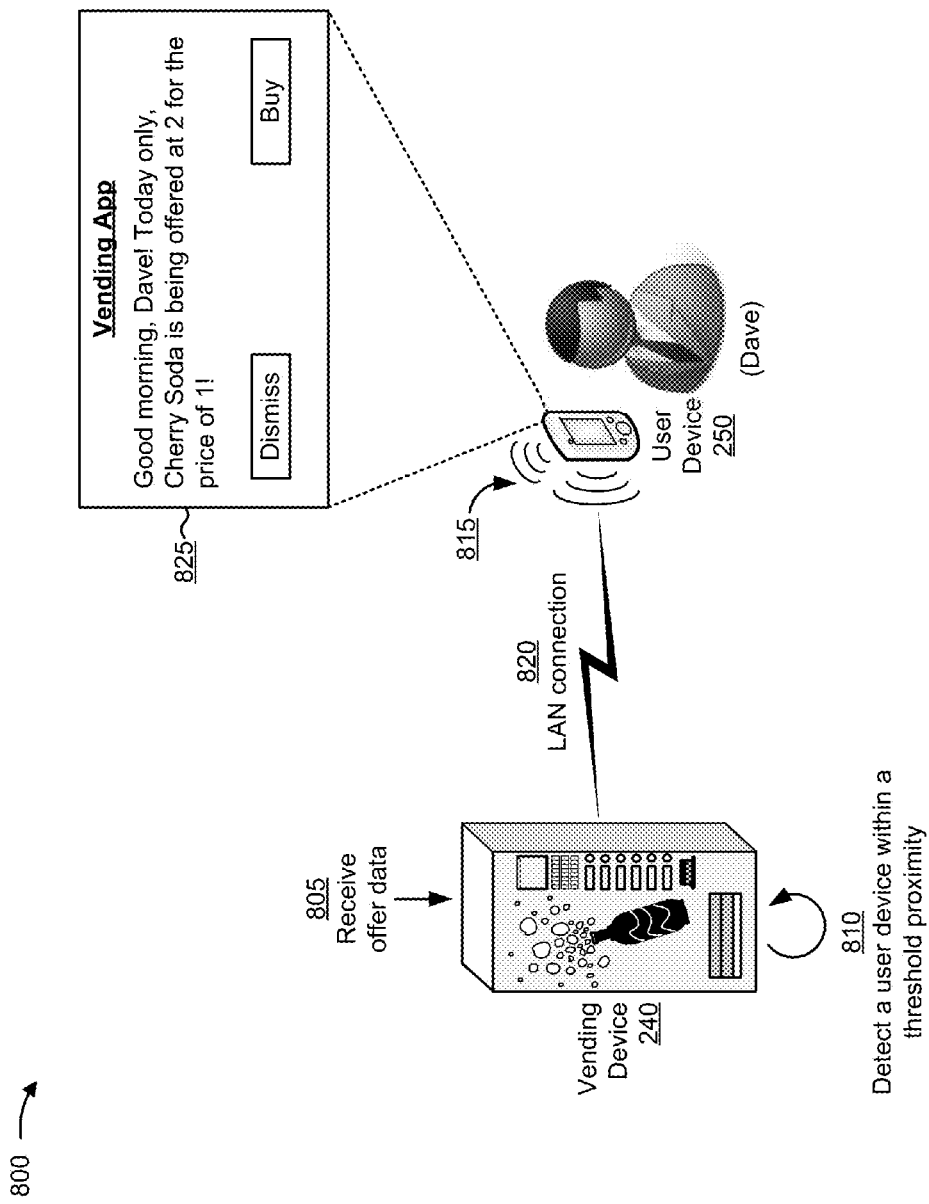
FIGS. 8A and 8B are diagrams of another example implementation relating to the example process shown in FIG. 6.
Figure 8B:
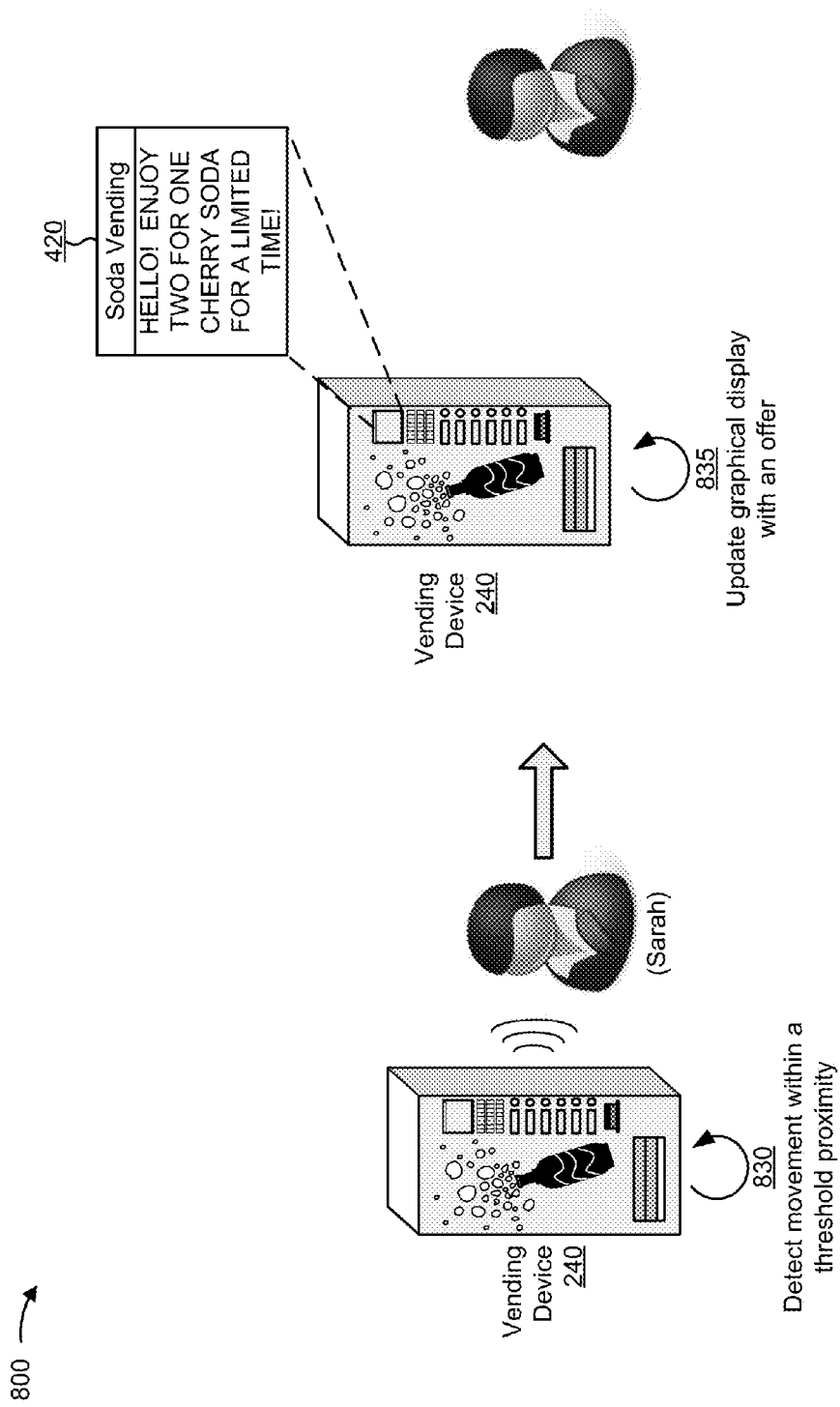

FIGS. 8A and 8B are diagrams of an example implementation 800 relating to example process 600 shown in FIG. 6. FIGS. 8A and 8B show an example of managing a group of vending devices.

As shown in FIG. 8A, vending device 240 receives offer data (e.g., from cloud server 220) identifying an offer that is to be provided for display to customers. Assume that the offer data indicates that a particular item of product is to be refilled by a technician within a threshold period of time, and is to be sold at a discount until the particular item of product is refilled. In this way, cloud server 220 and/or vending device 240 increase sales on the item of product (e.g., relative to utilizing static pricing) without causing the particular item of product to be out of stock for greater than the threshold period of time. As shown by reference number 810, vending device 240 detects that user device 250 is within a particular proximity to vending device 240 based on detecting a Bluetooth beacon 815 associated with user device 250. As shown by reference number 820, based on detecting that user device 250 is within the particular proximity to vending device 240, vending device 240 establishes a LAN connection 820 with user device 250 (e.g., a Bluetooth connection). As shown by reference number 825, vending device 240 causes information identifying the offer to be provided for display via a user interface of user device 250. The user interface includes information indicating that the particular item of product is being offered at a 2 for the price of 1 discount. In this way, vending device 240 provides information identifying dynamic product pricing using a display of user device 250.

As shown in FIG. 8B, and by reference number 830, based on sensor data from a motion sensor or a proximity sensor of vending device 240, vending device 240 detects movement of a potential customer, Sarah, within a threshold proximity (without detecting one or more user devices 250 with which to connect within the threshold proximity). As shown by reference number 835, vending device 240 updates display module 420 of vending device 240 to provide information identifying an offer. In another example, vending device 240 may play an audio message for the potential customer to obtain the potential customer's attention, may utilize a digital personal assistant module to talk with the potential customer to sell a product, or the like. In this way, vending device 240 provides information identifying dynamic product pricing without requiring a particular user device 250 to be present.

As indicated above, FIGS. 8A and 8B are provided merely as an example. Other examples are possible and may differ from what was described with regard to FIGS. 8A and 8B.

Figure 9A:
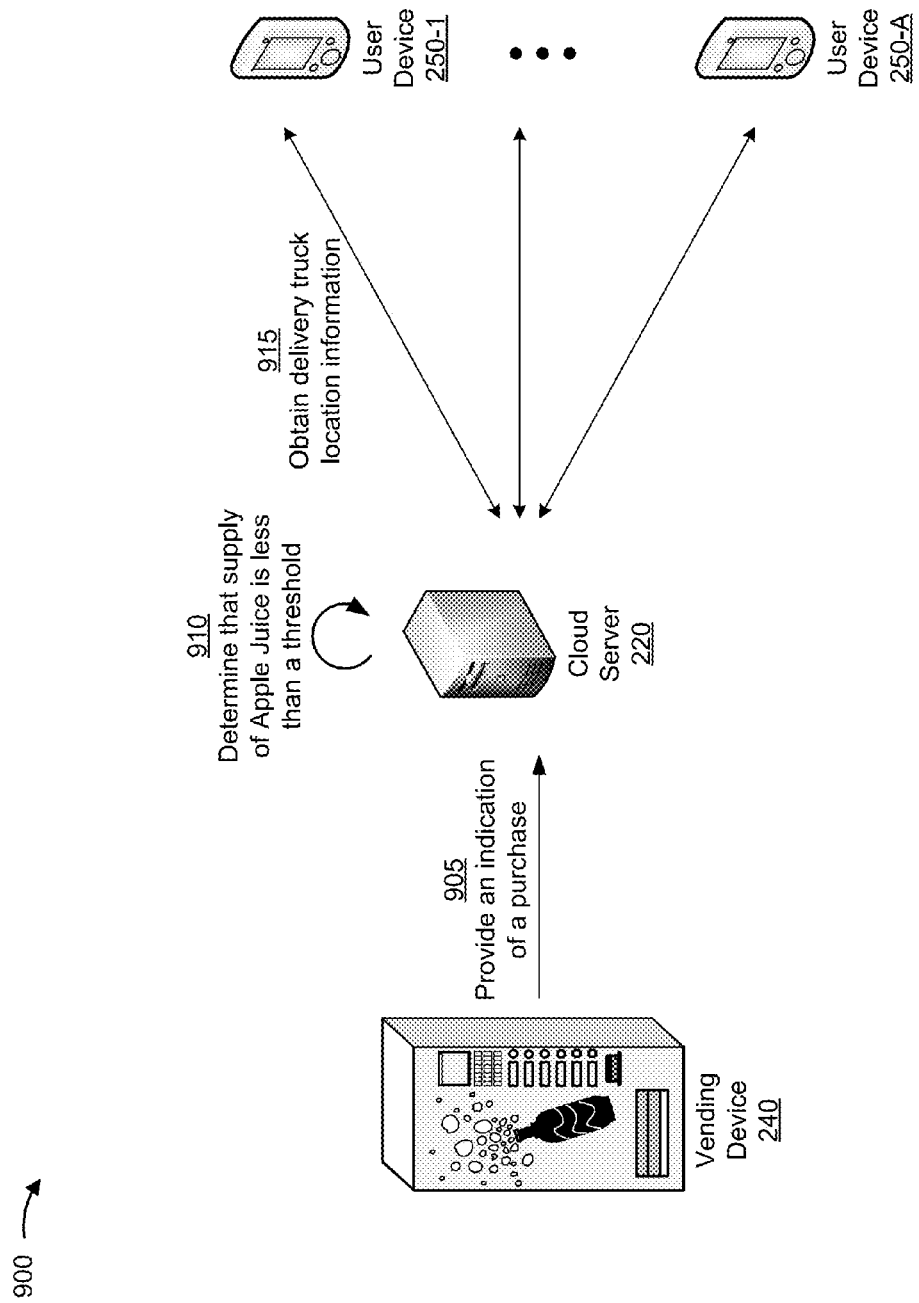
FIGS. 9A and 9B are diagrams of another example implementation relating to the example process shown in FIG. 6.
Figure 9B:
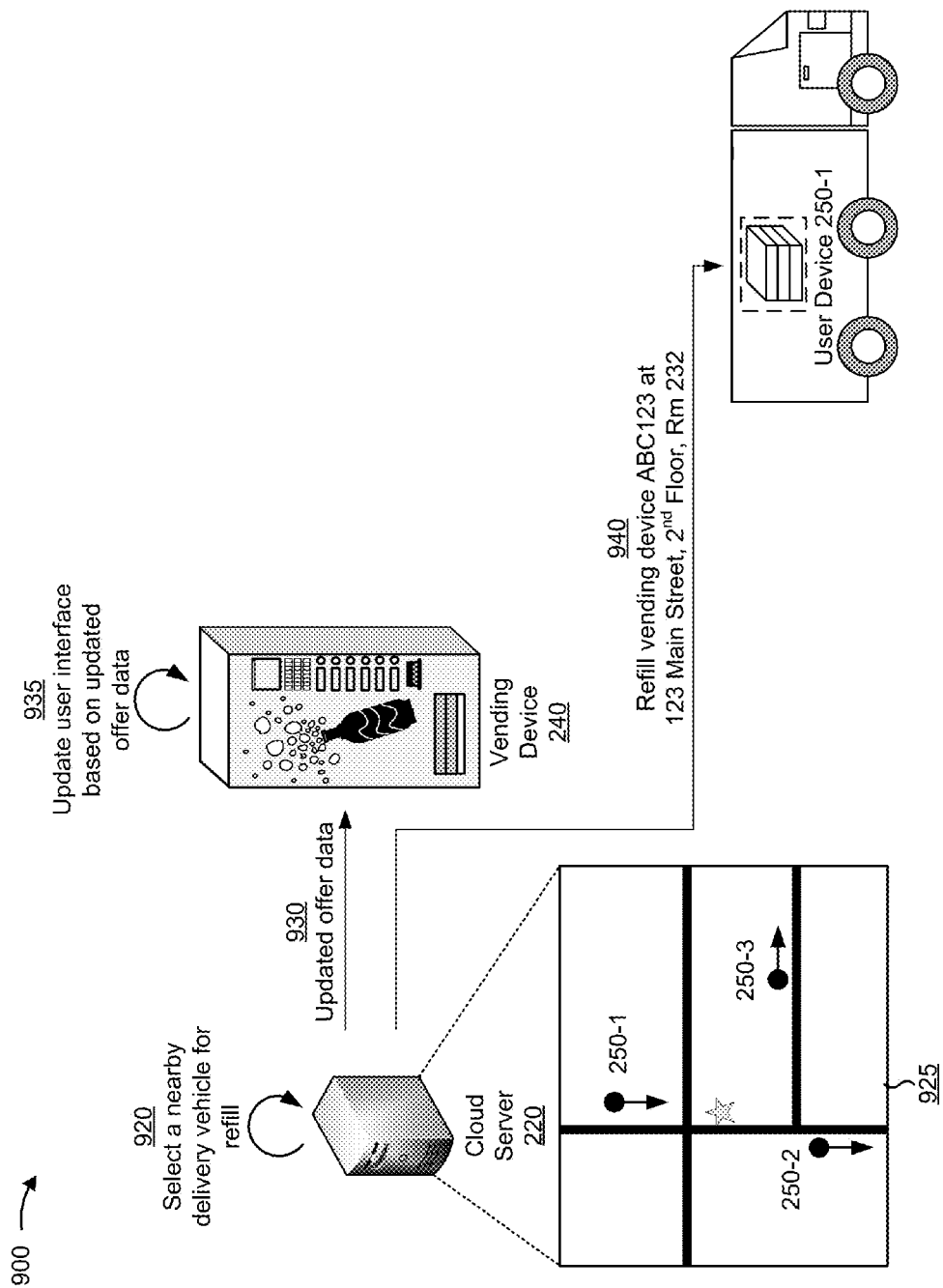

FIGS. 9A and 9B are diagrams of an example implementation 900 relating to example process 600 shown in FIG. 6. FIGS. 9A and 9B show an example of managing a group of vending devices.

As shown in FIG. 9A, and by reference number 905, vending device 240 provides information identifying a purchase to cloud server 220 to cause cloud server 220 to selectively dispatch a technician to restock vending device 240. As shown by reference number 910, cloud server 220 determines, based on receiving the information identifying the purchase, that a quantity of a particular item of product (e.g., Apple Juice), stored inside vending device 240, satisfies a threshold. As shown by reference number 915, cloud server 220 exchanges data from a group of user devices 250-1 through 250-A to obtain delivery vehicle location information for a set of delivery vehicles in which the set of user devices 250 are located.

As shown in FIG. 9B, and by reference number 920, cloud server 220 selects a particular delivery vehicle associated with user device 250-1 to perform a delivery of the particular item of product based on location information 925 indicating that user device 250-1 is within a threshold proximity of vending device 240 and moving in a direction of vending device 240. In another example, cloud server 220 may perform an optimization technique to determine an optimal set of delivery routes for a set of delivery vehicles, and may select the particular delivery vehicle to perform the delivery to vending device 240 based on performing the optimization technique. As shown by reference number 930, cloud server 220 provides updated offer data to vending device 240 to indicate that vending device 240 is to receive a delivery of the particular item of product and is to discount the particular product until the delivery is performed, thereby increasing sales relative to maintaining a static price for the product. As shown by reference number 935, vending device 240 updates a user interface (e.g., display module 420) to indicate that the particular item of product is being discounted. As shown by reference number 940, cloud server 220 transmits an alert to user device 250-1 (e.g., for display to a driver of the particular delivery vehicle) identifying a location of vending device 240 to cause the particular product to be refilled with items of the particular product stored inside the delivery vehicle. In another example, cloud server 220 provides turn-by-turn directions, toward the location of vending device 240, via a user interface of user device 250-1 based on a location of user device 250-1, traffic information, or the like. In this way, cloud server 220 reduces a likelihood that vending device 240 is out of stock of a particular item of product relative to the particular item of product being restocked based on a static delivery route.

As indicated above, FIGS. 9A and 9B are provided merely as an example. Other examples are possible and may differ from what was described with regard to FIGS. 9A and 9B.

Figure 10A:
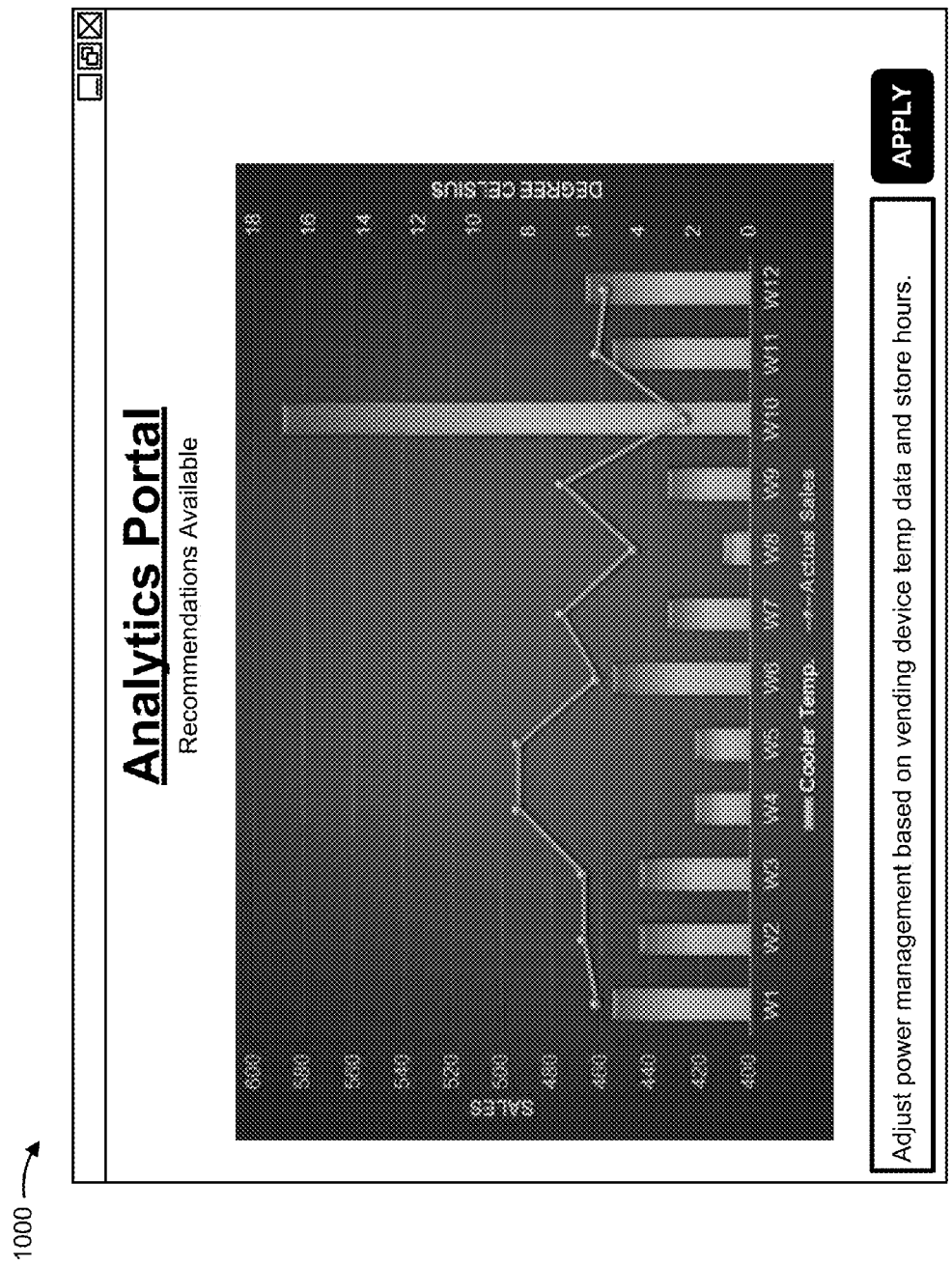
FIGS. 10A-10C are diagrams of another example implementation relating to the example process shown in FIG. 6.
Figure 10B:
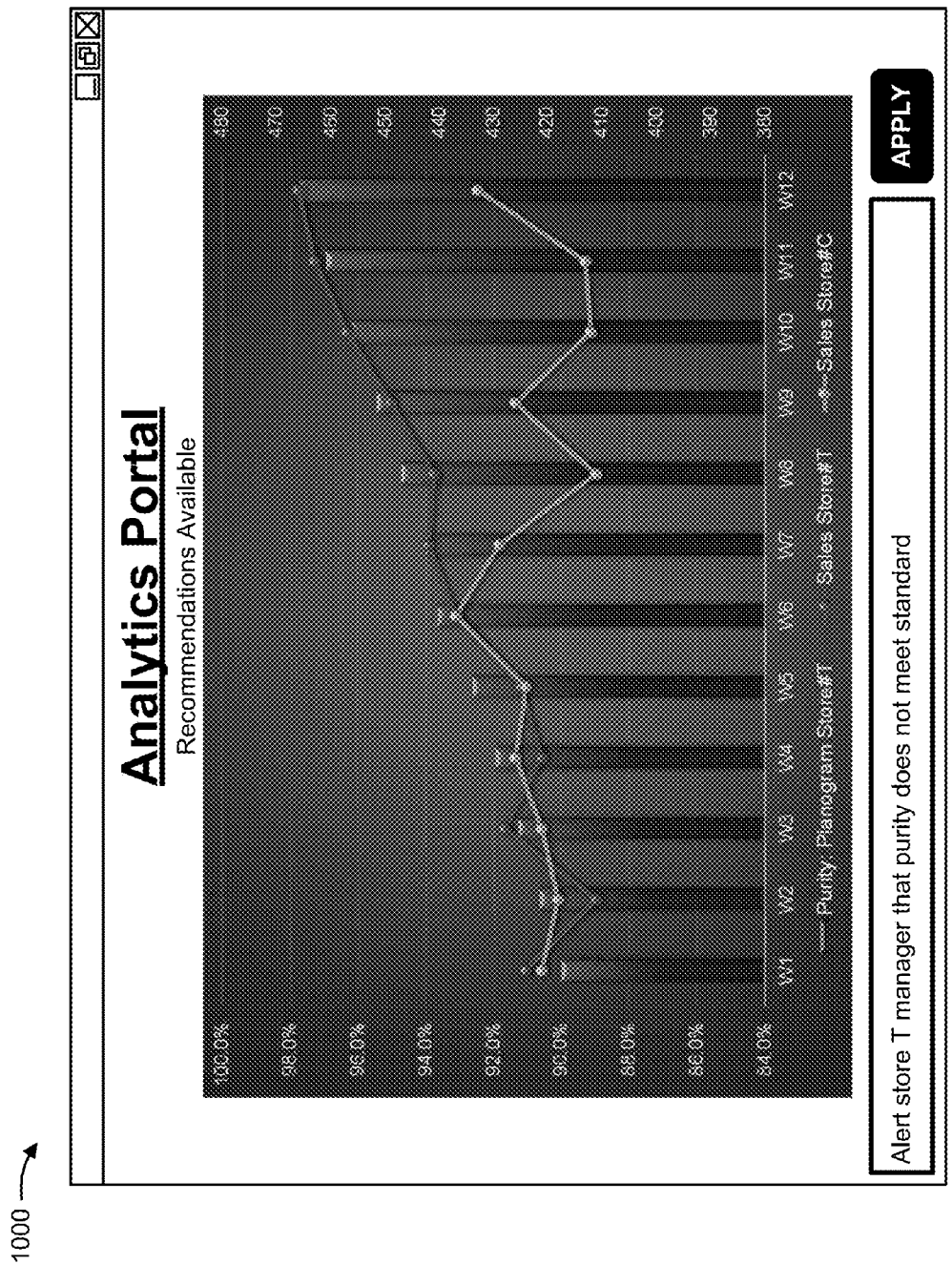
Figure 10C:
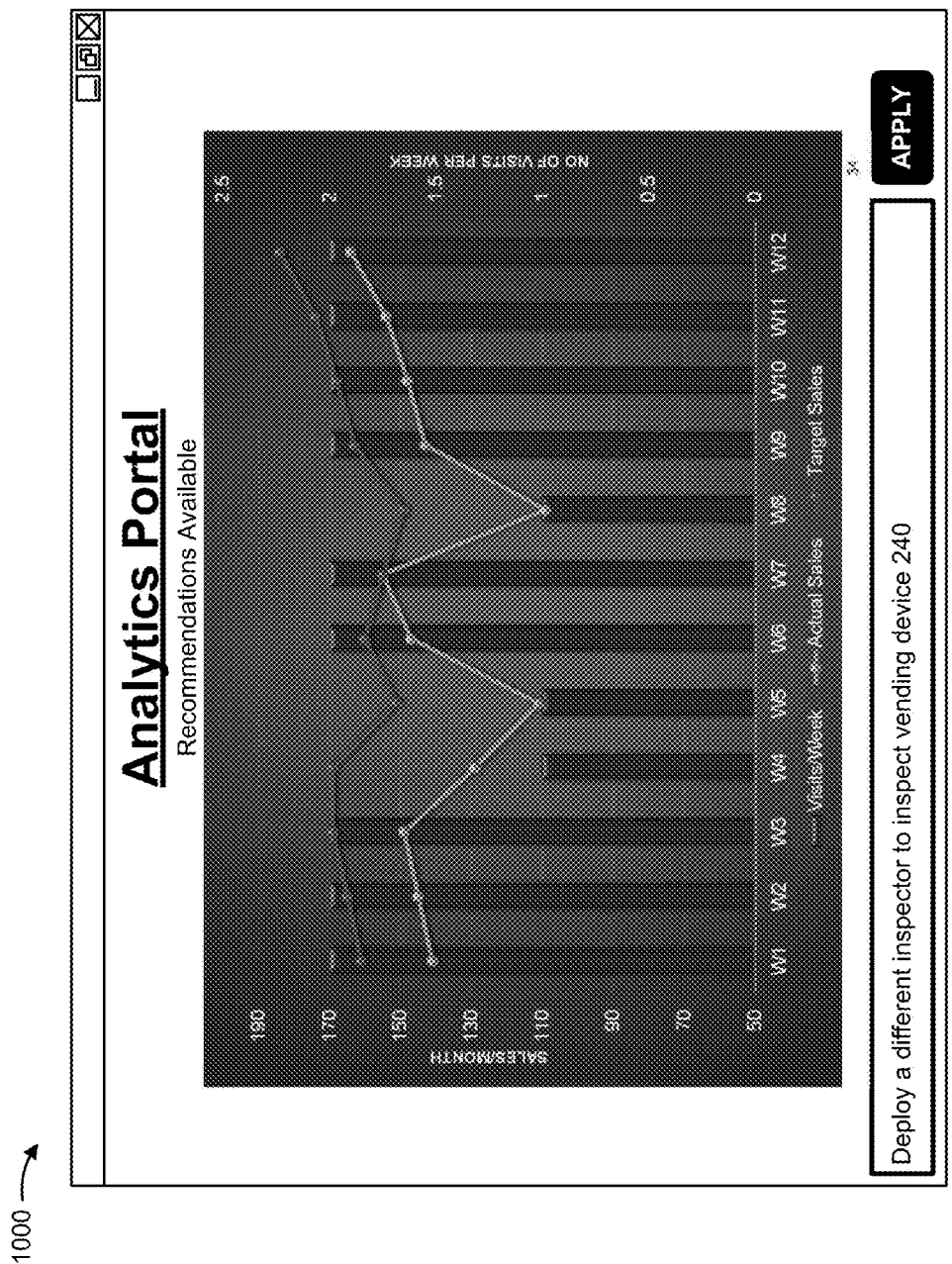

FIGS. 10A-10C are diagrams of an example implementation 1000 relating to example process 600 shown in FIG. 6. FIGS. 10A-10C show an example of managing a group of vending devices.

As shown in FIG. 10A, cloud server 220 generates a first user interface for display of first analytics information via client device 210. The first user interface includes information identifying an internal temperature (e.g., Cooler Temp) for vending device 240 at a particular store location and a quantity of product sales at the particular store location. Assume that cloud server 220 identifies an inverse correlation between the internal temperature and the quantity of product sales. Cloud server 220 provides, via the first user interface, a recommendation to reduce an internal temperature of vending device 240 based on identifying the inverse correlation, and may cause the recommendation to be applied based on transmitting information to vending device 240. In another example, cloud server 220 may determine that a cost of utilizing a compressor of vending device 240 to reduce the internal temperature of vending device 240 offsets an increase in sales relating to reducing the internal temperature, and may determine not to adjust the internal temperature of cloud server 220 based on identifying the offset increase in sales. In another example, cloud server 220 may automatically implement the recommendation without requesting user confirmation.

As shown in FIG. 10B, cloud server 220 generates a second user interface for display of second analytics information via client device 210. The second user interface includes information identifying a particular sales metric for a particular store location (e.g., Store#T) associated with vending device 240, a control group sales metric for a set of control group store locations (e.g., Store#C) similar to the particular store location, and a purity metric for the first store location. The purity metric is determined based on an image analysis of sensor data received from an image sensor of vending device 240. Assume that cloud server 220 identifies a correlation between the purity metric and the particular sales metric for the particular store location that is statistically significant relative to the control group sales metric. Cloud server 220 provides, via the second user interface, a recommendation to transmit an alert to user device 250 (e.g., utilized by a store manager of the particular store location) to cause the store manager to ensure that the purity metric is increased, thereby increasing sales at the particular store location. For example, cloud server 220 may provide an alert indicating that the store manager is to cause labels of items of product inside vending device 240 to face toward customers or to remove competitor items of product.

As shown in FIG. 10C, cloud server 220 generates a third user interface for display of third analytics information via client device 210. The third user interface includes information identifying an actual sales metric for a group of vending devices 240, a target sales metric for the group of vending devices 240, and a quantity of sales visits performed by an inspector. Assume that cloud server 220 identifies a lack of a correlation between a quantity of visits by the inspector and a likelihood that the actual sales metric meets or exceeds the target sales metric. Cloud server 220 provides, via the third user interface, a recommendation that another inspector is to be deployed to replace the inspector. In this way, cloud server 220 may automatically select employees for a task based on sales metrics relating to employee performance.

As indicated above, FIGS. 10A-10C are provided merely as an example. Other examples are possible and may differ from what was described with regard to FIGS. 10A-10C.

In this way, vending device 240 may utilize sensor data to improve sales metrics, reduce power consumption, reduce a likelihood of component failure, or the like relative to another type of vending machine that does not utilize sensor data. Moreover, cloud server 220 may receive sensor data from one or more vending devices 240, and may process the sensor data to identify response actions related to improving sales metrics, reducing power consumption, reducing a likelihood of component failure, increasing an efficiency of delivery or repair operations, or the like relative to a vending device provider utilizing static delivery and maintenance schedules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network connected dispensing device, comprising:
a storage unit to house one or more items to be dispensed;
a set of sensor modules to obtain sensor data regarding the network connected dispensing device,
the set of sensor modules including two or more of a temperature sensor, an image sensor, a motion sensor, or a location sensor;
a management module,
the management module being associated with receiving the sensor data from the set of sensor modules to be processed to identify a response action,
the management module being associated with providing information associated with the sensor data to a cloud server of a cloud network via a network connection and receiving information from the cloud server regarding the response action,
the received information from the cloud server being based upon identifying a pattern with regard to component malfunction based on sensor data associated with a first group of network connected dispensing devices, and
the first group of network connected dispensing devices including the network connected dispensing device; and
an integration module,
the integration module being associated with causing an alteration to a component of the network connected dispensing device based on the response action being identified,
the alteration to the component being related to causing the one or more items to be made available to be dispensed.

2. The network connected dispensing device of claim 1, further comprising:
a power management module,
the power management module being associated with receiving information from the integration module associated with causing the alteration to a power management configuration and altering the power management configuration based on the alteration.

3. The network connected dispensing device of claim 1, further comprising:
a display module,
the display module being associated with providing information for display based on receiving an instruction from the management module,
the information identifying at least one of:
an availability of an item to be dispensed,
dynamic pricing information relating to the item, or
an advertisement.

4. The network connected dispensing device of claim 1, further comprising:
a communications module,
the communications module being associated with establishing a connection to a user device external to the network connected dispensing device and causing information to be provided for display via the user device.

5. The network connected dispensing device of claim 1, further comprising:
a communications module,
the communications module being associated with establishing a connection to the cloud server via at least one of:
a Wi-Fi connection,
an Ethernet connection, or
a Bluetooth connection.

6. The network connected dispensing device of claim 1, further comprising:
a vibration sensor, of the set of sensor modules, to identify vibration sensor data relating to vibration of one or more components of the network connected dispensing device.

7. The network connected dispensing device of claim 1, further comprising:
an image processor module,
the image processor module being associated with processing a portion of the sensor data relating to the image sensor, and the image processor module being associated with determining, based on processing the portion of sensor data, at least one of:
an identification of the one or more items,
an orientation of the one or more items, or
an identification of a potential customer.

8. A cold drink equipment, comprising:
a refrigerated storage unit to house one or more items of product for sale,
the refrigerated storage unit including a door that permits a distribution of a particular item of product of the one or more items of product for sale;
a plurality of sensors to obtain sensor data regarding the cold drink equipment,
the plurality of sensors including a door sensor to detect that the door is opened, an image sensor to detect contents of the refrigerated storage unit, and a temperature sensor to obtain an internal temperature of the refrigerated storage unit;
a communications module to provide the sensor data to be processed using a data model and to receive information identifying a response action based on providing the sensor data to be processed using the data model,
the response action relating to an alteration to a configuration of the cold drink equipment,
the received information being based upon the data model identifying a pattern with regard to component malfunction based on sensor data associated with a first group of cold drink equipment, and
the first group of cold drink equipment including the cold drink equipment; and
an integration module to cause the alteration to the configuration of the cold drink equipment based on the response action.

9. The cold drink equipment of claim 8, further comprising:
a proximity sensor to detect that a potential customer is within a threshold proximity of the cold drink equipment and cause an advertisement to be provided for display via a display module based on detecting that the potential customer is within the threshold proximity.

10. The cold drink equipment of claim 8, further comprising:
a beacon monitor to detect a beacon associated with a user device and cause the communications module to connect to the user device based on detecting the beacon.

11. The cold drink equipment of claim 8, further comprising:
a management module to cause a delivery vehicle to be dispatched to deliver a set of items of product when a quantity of items of product included in the refrigerated storage unit satisfies a threshold,
the management module being associated with causing the communications module to transmit a message to a user device associated with the delivery vehicle indicating that the set of items of product are to be delivered.

12. The cold drink equipment of claim 8, further comprising:
a management module to cause a technician to be dispatched to repair a component of the cold drink equipment when the sensor data indicates that the component is malfunctioning,
the management module being associated with causing the communications module to transmit a message to a user device utilized by the technician indicating that the component is malfunctioning.

13. The cold drink equipment of claim 8, further comprising:
a set of configurable components,
the set of configurable components including a compressor component to receive an instruction from the integration module to selectively operate based on the response action relating to altering the internal temperature of the refrigerated storage unit.

14. The cold drink equipment of claim 8, further comprising:
an external temperature sensor to obtain data regarding an ambient temperature external to the refrigerated storage unit,
the communications module being associated with providing the data regarding the ambient temperature to a server to cause the server to identify the response action,
the server storing the data model.

15. A method, comprising:
obtaining, by a vending device, sensor data regarding the vending device,
the sensor data being obtained from a group of sensors of the vending device;
transmitting, by the vending device, the sensor data via a network connection for processing by a server,
the server storing a data model,
the server being associated with identifying a response action associated with altering a configuration of the vending device;
receiving, by the vending device, information identifying the response action based on transmitting the sensor data via the network connection;
causing, by the vending device, the response action to be performed based on receiving the information identifying the response action,
the response action being associated with altering a status of a component of the vending device,
the received information being based upon the data model identifying a pattern with regard to component malfunction based on sensor data associated with a first group of vending devices, and
the first group of vending devices including the vending device; and
providing, by the vending device, information associated with identifying the status of the component.

16. The method of claim 15, where causing the response action to be performed comprises:
altering a configuration of a power management module to alter a power utilization of the vending device.

17. The method of claim 15, where causing the response action to be performed comprises:
altering a configuration of a compressor to alter an internal temperature of the vending device.

18. The method of claim 15, where causing the response action to be performed comprises:
altering a price for which an item of product is dispensed by the vending device.

19. The method of claim 15, further comprising:
detecting input of a request to dispense a particular item of product;
performing a transaction based on the request to dispense the particular item of product;
dispensing the particular item of product based on performing the transaction; and providing, to the server, information indicating that the particular item of product is dispensed based on dispensing the particular item of product.

20. The method of claim 15, further comprising:

detecting, based on the sensor data, that the vending device is at a first location,
   the first location satisfying a threshold distance from a second location; and
where transmitting the sensor data via the network connection comprises:
   transmitting information indicating that the vending device is at the first location based on the first location satisfying the threshold distance from the second location.

* * * * *